US007647146B2

(12) United States Patent
Taki

(10) Patent No.: US 7,647,146 B2
(45) Date of Patent: Jan. 12, 2010

(54) VEHICULAR DIAGNOSTIC METHOD, VEHICULAR DIAGNOSTIC SYSTEM, VEHICLE AND CENTER

(75) Inventor: Naoki Taki, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 456 days.

(21) Appl. No.: 10/565,781

(22) PCT Filed: Jul. 16, 2004

(86) PCT No.: PCT/IB2004/002307

§ 371 (c)(1),
(2), (4) Date: Jan. 25, 2006

(87) PCT Pub. No.: WO2005/010477

PCT Pub. Date: Feb. 3, 2005

(65) Prior Publication Data
US 2006/0247832 A1 Nov. 2, 2006

(30) Foreign Application Priority Data
Jul. 25, 2003 (JP) ............................. 2003-280363

(51) Int. Cl.
*G01M 13/00* (2006.01)
(52) U.S. Cl. ........................................ 701/33; 455/423
(58) Field of Classification Search ............... 701/1, 701/29, 36; 709/218; 455/423, 67.11; 702/182–184, 702/62, 108, 122, 123, 188; 340/426.13, 340/426.16–426.18, 539.11, 539.14
See application file for complete search history.

(56) References Cited
U.S. PATENT DOCUMENTS

| 6,330,499 | B1 | 12/2001 | Chou et al. | |
|---|---|---|---|---|
| 2002/0044049 | A1* | 4/2002 | Saito et al. | 340/438 |
| 2002/0156558 | A1* | 10/2002 | Hanson et al. | 701/33 |
| 2004/0186687 | A1* | 9/2004 | Ogura et al. | 702/185 |
| 2005/0038579 | A1* | 2/2005 | Lewis | 701/29 |
| 2005/0154500 | A1* | 7/2005 | Sonnenrein et al. | 701/1 |

FOREIGN PATENT DOCUMENTS

| EP | 0 383 593 | 8/1990 |
|---|---|---|
| EP | 0 718 614 | 11/1995 |
| EP | 1 087 343 | 3/2001 |
| JP | 62-94443 | 4/1987 |
| WO | WO 90/09645 | 8/1990 |

* cited by examiner

*Primary Examiner*—Dalena Tran
(74) *Attorney, Agent, or Firm*—Finnegan, Henderson, Farabow, Garrett & Dunner LLP

(57) ABSTRACT

When determining that a failure has occurred, a vehicle (10) transmits alarm lamp illumination information, vehicle ID information and user identification information to a center (20). The center (20) transmits the received alarm lamp illumination information to an automobile dealer computer (30) at an automobile dealer. The center (20) then obtains abnormality countermeasure information transmitted from the automobile dealer, prepares an abnormality notification, and transmits the abnormality notification to the vehicle (10). The vehicle (10) notifies a user of the abnormality notification, and reserves servicing at the automobile dealer through an operation of a reservation button performed by the user. With the reservation, the center (20) transmits an abnormality transmission request to the vehicle (10). The vehicle (10) collects failure information in response to the failure information transmission request, and transmits the failure information to the center (20). The center (20) transmits detailed abnormality countermeasure information transmitted from the automobile dealer to the vehicle (10).

31 Claims, 14 Drawing Sheets

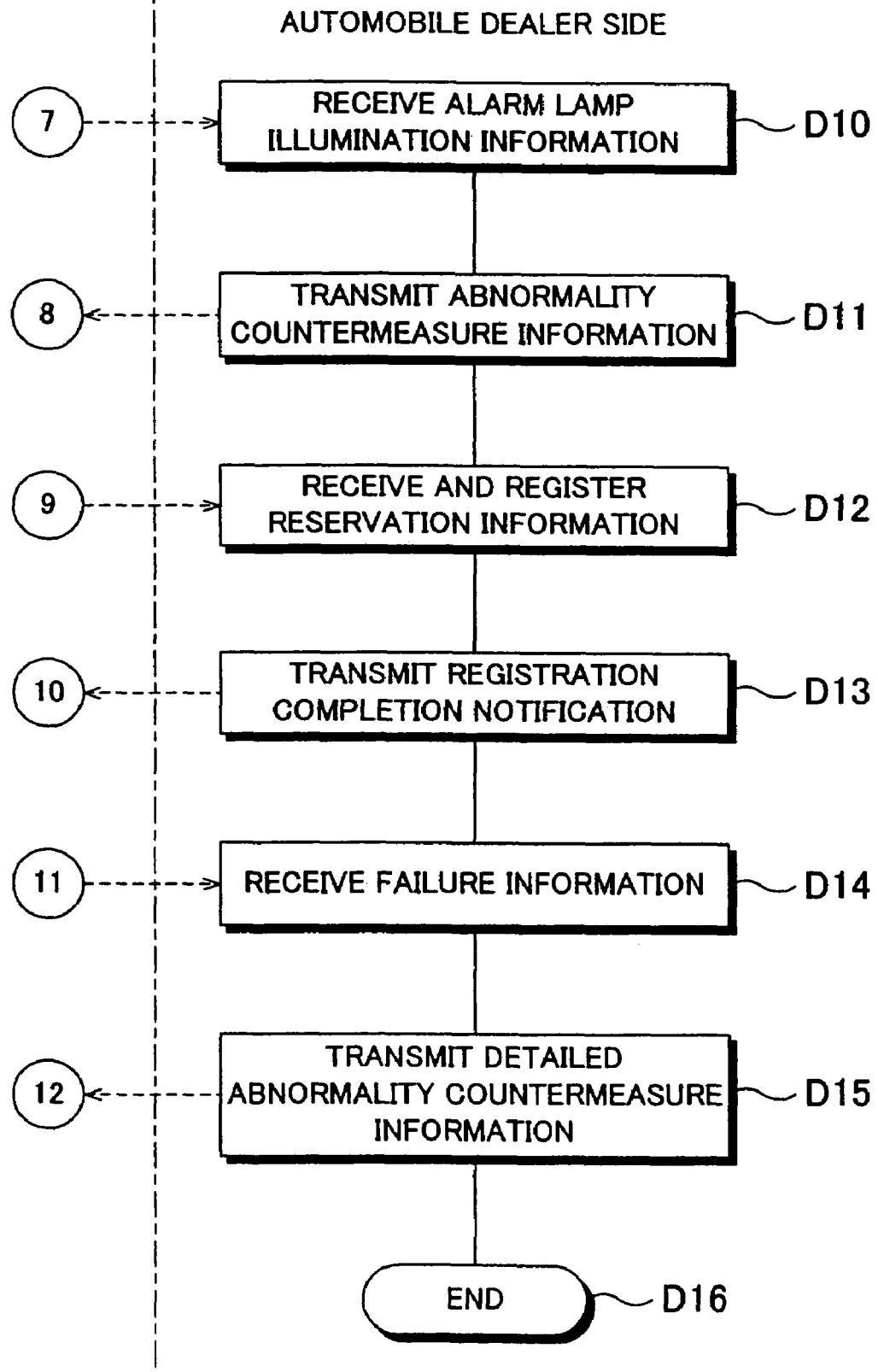

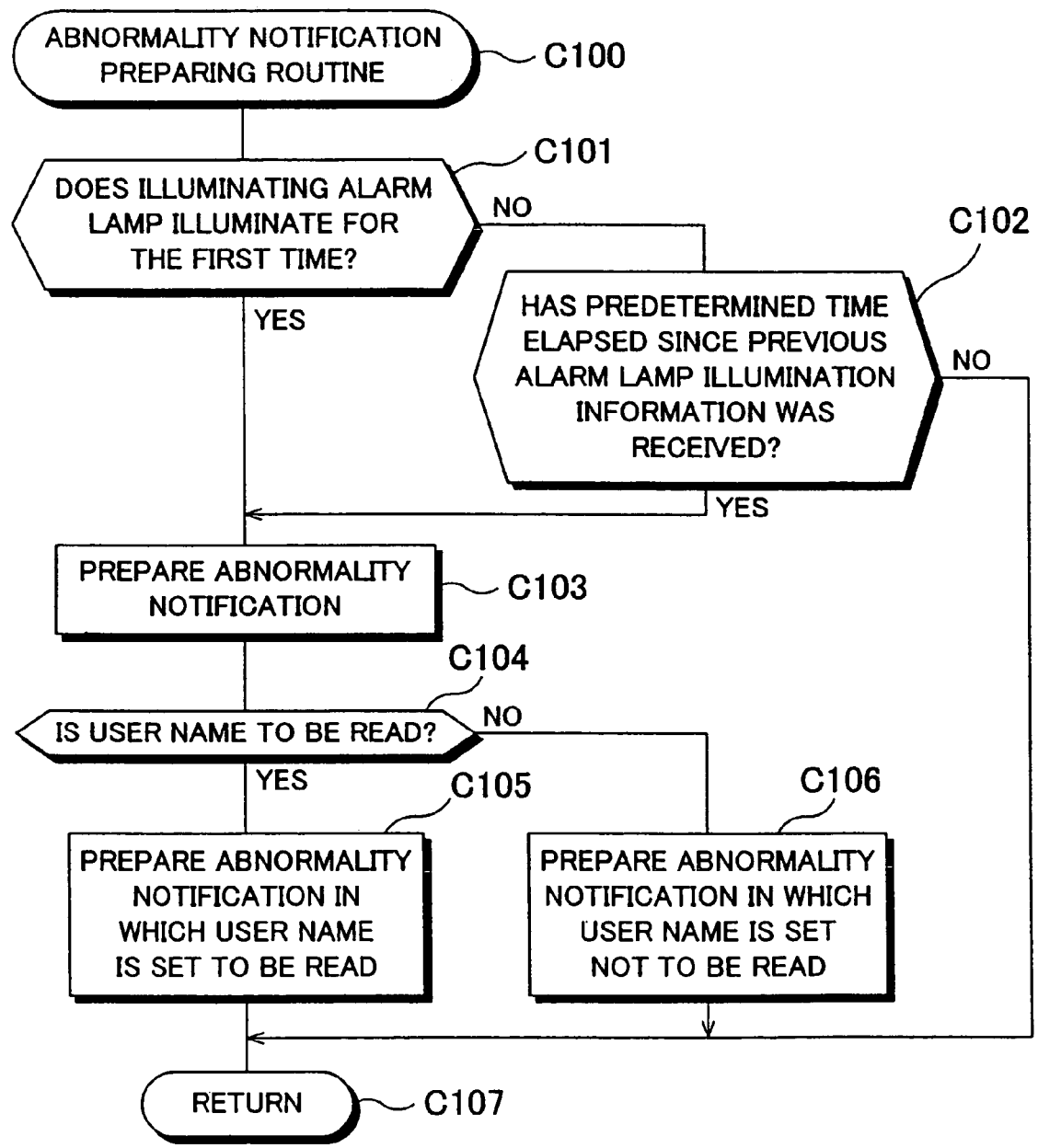

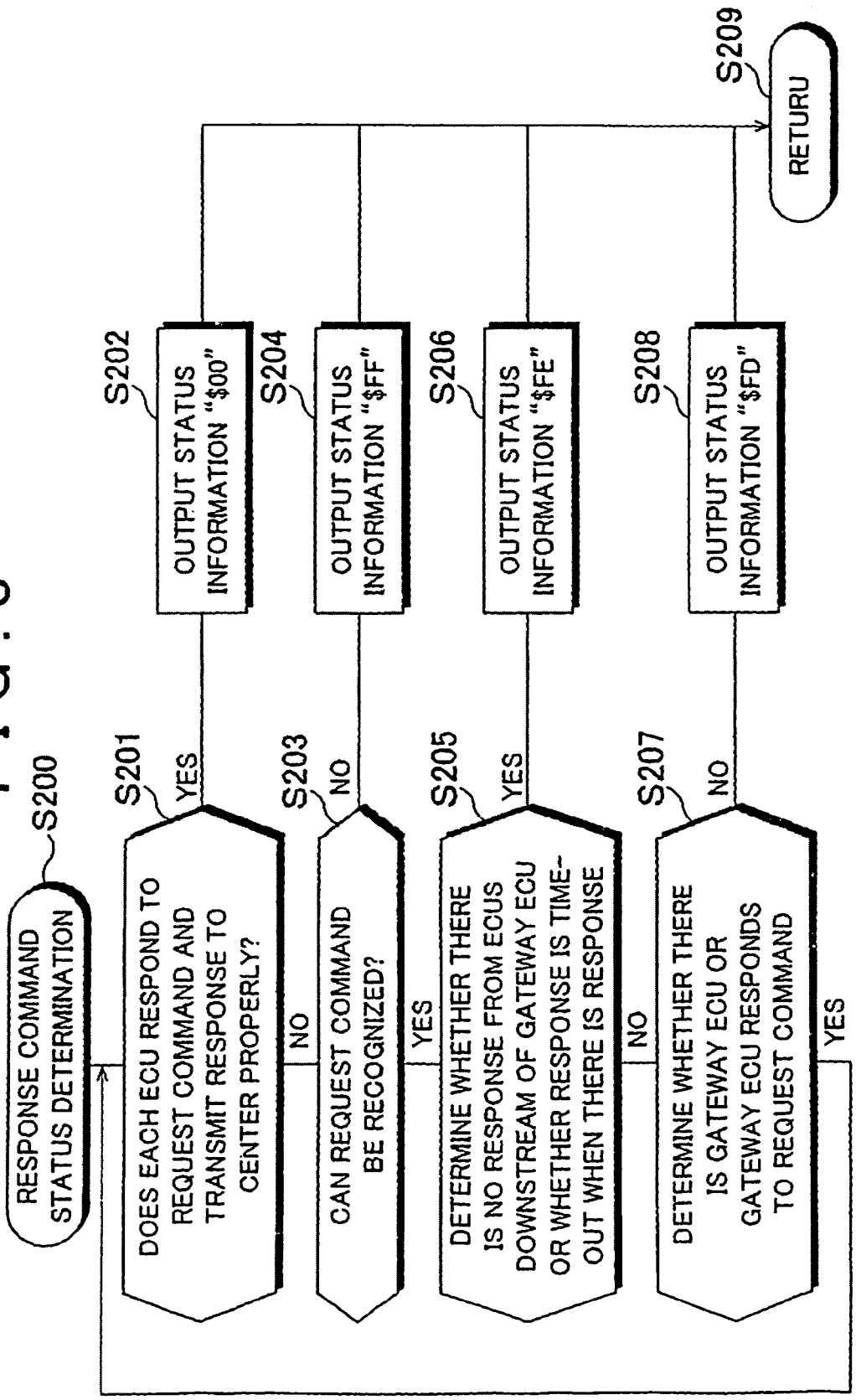

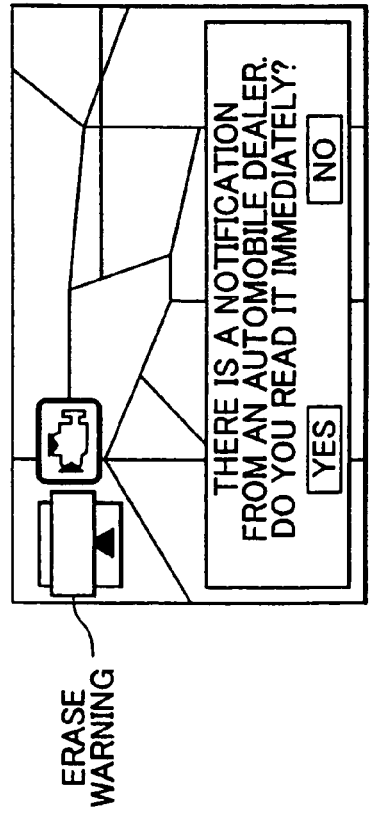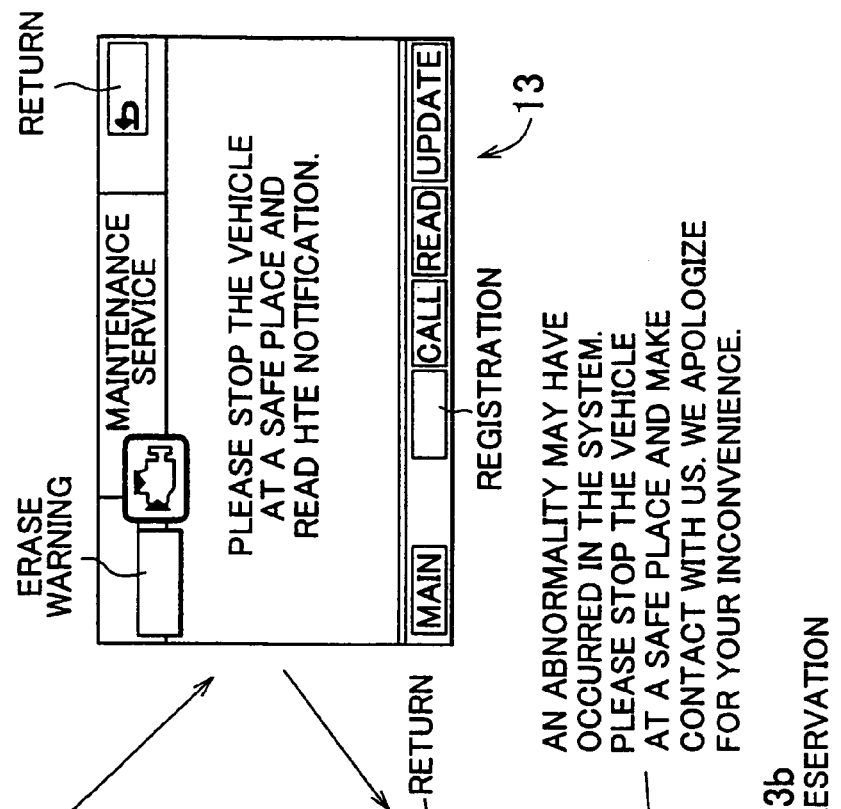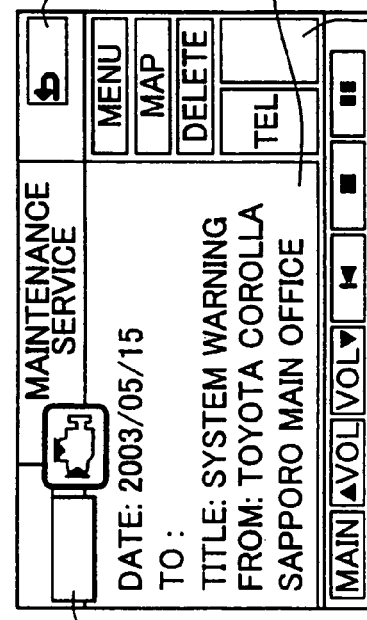

VEHICULAR DIAGNOSTIC METHOD, VEHICULAR DIAGNOSTIC SYSTEM, VEHICLE AND CENTER

FIELD OF THE INVENTION

The invention relates to a vehicular diagnostic method for diagnosing an abnormality which has occurred in a vehicle, a vehicular diagnostic system, and elements of the vehicular diagnostic system (a vehicle and a center in the vehicular diagnostic system).

BACKGROUND OF THE INVENTION

For example, as disclosed in Japanese Patent-Laid Open Publication No. 62-94443, a vehicular diagnostic system has been known. The vehicular diagnostic system includes a self-diagnostic device which diagnoses a failure in a vehicle. When a failure is detected by the self-diagnostic device, the diagnostic result is transmitted to a center. The center estimates a cause of the failure based on the obtained diagnostic result, and transmits countermeasures for the estimated cause of the failure to the vehicle.

In the above vehicular diagnostic system, when a failure occurs in a vehicle, a self-diagnostic result is transmitted to the center. In recent years, a large number of electronically controlled devices is mounted on a vehicle, and a large volume of data is output from these devices. Therefore, as in the vehicular diagnostic system, if the self-diagnostic result is transmitted to the center, an enormous volume of communication data is transmitted, which may increase communication costs. Also, an enormous volume of communication data increases communication time, which raises a possibility that the center cannot diagnose a failure in the vehicle in real time.

In addition, the number of vehicles communicating with the center has increased, and each vehicle transmits an enormous volume of communication data, which raises a possibility that a communication line is saturated. As a result, a communication disturbance may occur. Particularly, it should be avoided that communication with a vehicle in distress is interrupted. When the center and the vehicle communicate with each other, necessary information should be transmitted/received when necessary.

DISCLOSURE OF THE INVENTION

It is an object of the invention to provide a vehicular diagnostic method in which necessary information can be transmitted/received when necessary, a vehicular diagnostic system, and elements in the vehicular diagnostic system (a vehicle and a center in the vehicular diagnostic system).

A first aspect of the invention relates to a vehicular diagnostic method. In the method, a vehicle and a center are connected so as to be able to communicate with each other, the vehicle transmits information regarding a failure in the vehicle to the center, and the center diagnoses the failure which has occurred in the vehicle based on the information regarding the failure transmitted from the vehicle.

In the first aspect of the invention, the vehicle determines whether a failure has occurred in a device mounted in the vehicle. When determining that a failure has occurred, the vehicle transmits first failure information indicating the occurrence of the failure to the center. After transmitting the first failure information to the center, the vehicle collects details regarding the failure, and then transmits second failure information indicating the collected details regarding the failure to the center.

According to the first aspect, since the first failure information indicates the fact that a failure has occurred in the vehicle, the volume of data can be small. Therefore, a load placed on a communication line due to transmission of the first failure information to the center can be minimized, which enables the center to ascertain whether a failure has occurred in the vehicle in real time. As a result, the center can promptly provide a user with appropriate countermeasures. After transmitting the first failure information, the vehicle collects details regarding the failure, and transmits the second failure information. The center can check the failure in more detail based on the second failure information. Therefore, the center can provide the user with more appropriate countermeasures.

In a second aspect of the invention, a vehicle determines whether a failure has occurred in a device mounted in the vehicle. When determining that a failure has occurred, the vehicle transmits first failure information indicating the occurrence of the failure to a center. The center receives the first failure information transmitted from the vehicle, and transmits first countermeasure information indicating countermeasures for the occurrence of the failure corresponding to the received first failure information. The vehicle receives the first countermeasure information transmitted from the center, notifies a user of the vehicle of the countermeasures indicated in the first countermeasure information based on the first countermeasure information, collects details regarding the failure, and transmits second failure information indicating the collected details regarding the failure. The center receives the second failure information transmitted from the vehicle, checks the specifics regarding the failure based on the obtained second failure information, and transmits second countermeasure information indicating detailed countermeasures for the failure corresponding to the second failure information to the vehicle. The vehicle receives the second countermeasure information transmitted from the center, and notifies the user of the vehicle of detailed countermeasures indicated in the second countermeasure information based on the second countermeasure information.

According to the second aspect, since the center transmits the first countermeasure information for the occurrence of the failure based on the first failure information, the user can ascertain the occurrence of the failure promptly, and can take appropriate measures to deal with the failure easily. Ia addition, since the center transmits the second countermeasure information for the failure based on the second failure information, the user can take appropriate measures to deal with the failure.

In this case, it is preferable that a computer which is connected to a network so as to be able to communicate with the center be provided in an automobile dealer which performs servicing of the vehicle, the center transmit the first failure information and the second failure information transmitted from the vehicle, to the computer, and the computer prepare the first countermeasure information corresponding to the first failure information transmitted from the center and the second countermeasure information corresponding to the second failure information transmitted from the center, and transmit the prepared first countermeasure information and the second countermeasure information to the center.

Thus, the first countermeasure information and the second countermeasure information including expert opinions on the failure can be transmitted to the user. Therefore, the user can take more appropriate countermeasures for the failure. Also, a engineer present at the automobile dealer can analyze the specifics of the failure. This makes it possible to take individual countermeasures for each cause of the failure, which enables the user to take more appropriate countermeasures for the failure.

The vehicle may determine whether a failure has occurred in a device mounted in the vehicle based on whether an alarm lamp, which illuminates when an abnormality has occurred in the device mounted in the vehicle, illuminates. The first failure information may be alarm lamp illumination information which indicates that the alarm lamp illuminates.

Since the alarm lamp illumination information which indicates that the alarm lamp illuminates can be used as the first failure information, the volume of data can be small. Therefore, a load placed on a communication line due to transmission of the alarm lamp illumination information to the center can be minimized, which enables the center to ascertain whether a failure has occurred in the vehicle in real time. As a result, the center can promptly provide the user with countermeasures.

In the above-mentioned cases, it is preferable that details regarding the failure indicated in the second failure information include at least one of information indicating results of detection performed by various sensors mounted in the vehicle, information indicating an operation state of the device mounted in the vehicle, and information indicating a result of self-diagnosis performed by the device mounted in the vehicle. Thus, the center or the automobile dealer can transmit the information necessary to accurately ascertain the specifics of the failure, and provide the user with appropriate countermeasures.

It is preferable that the center transmit transmission request information for requesting the vehicle to transmit the second failure information, after receiving the first failure information from the vehicle, and the vehicle receive the transmission request information transmitted from the center, and transmit the second failure information to the center in response to the received transmission request information. The center can thus obtain the second failure information from the vehicle when necessary. Therefore, the center can transmit the second countermeasure information to the user at appropriate timing.

It is preferable that the vehicle determine whether the vehicle is running, and prohibit collection of at least the details regarding the failure indicated in the second failure information when determining that the vehicle is running. Thus, the details regarding the failure are not collected, when a high load is placed on in-vehicle units since the vehicle is running. This prevents an increase in the loads placed on the devices related to functions necessary for the vehicle to operate, namely, devices related to "running, stopping, and turning of the vehicle". Therefore, the user can drive the vehicle suitably.

In this case, it is preferable that the vehicle start collecting details regarding the failure indicated in the second failure information according to a predetermined operation performed by the user of the vehicle when determining that the vehicle is stopped. It is also preferable that the predetermined operation performed by the user of the vehicle be an operation performed by the user for directing start of collection of the details regarding the failure indicated in the second failure information. Further, it is preferable that the predetermined operation performed by the user of the vehicle be an operation of operating means in which a function for directing start of collection of the details regarding the failure indicated in the second failure information is set in advance.

Thus, the vehicle can transmit the second failure information to the center at appropriate timing. Also, the second failure information is transmitted according to the operation performed by the user. Therefore, an intention of the user can be directly or indirectly reflected on the determination of whether the second failure information is to be transmitted.

The details regarding the failure to be collected may be only the details related to the occurrence of the failure indicated in the first failure information. This prevents loads to be placed on the devices in which a failure has not occurred. Therefore, the user can drive the vehicle suitably.

It is preferable that the vehicle transmit the first failure information at intervals each of which is at least a predetermined period of time, when transmitting the first failure information to the center two or more times. Also, it is preferable that the center receive the first failure information at intervals each of which is at least a predetermined period of time, when receiving the first failure information from the vehicle two or more times.

Thus, the vehicle transmits and the center receives the first failure information at intervals each of which is at least the predetermined period of time, which reduces the load placed on the communication line. Also, the second failure information is transmitted after the first failure information is transmitted. Accordingly, by transmitting/receiving the information by the vehicle/the center at intervals each of which is at least the predetermined period of time, the second failure information can be reliably transmitted/received.

It is preferable that the vehicle transmit the second failure information at intervals each of which is at least a predetermined period of time, when transmitting the second failure information related to the same first failure information to the center two or more times. It is also preferable that the center receive the second failure information at intervals each of which is at least a predetermined period of time, when receiving the second failure information related to the same first failure information from the vehicle two or more times.

Thus, the same second failure information can be prevented from being received more frequently than is necessary, which reduces unnecessary communication. However, the details regarding the second failure information may be changed due to a lapse of predetermined time, even when the second failure information is related to the same first failure information. Even in this case, by transmitting/receiving the changed second failure information at appropriate timing, the center can transmit the second countermeasure information based on the newest second failure information to the vehicle. Therefore, the user can take appropriate countermeasures for the failure.

It is preferable that the center accumulate and store at least the first failure information from among the first failure information and the second failure information transmitted from the vehicle, and provide at least the first failure information from among the accumulated and stored first failure information and second failure information, in response to a request from an external terminal device.

Thus, the user can check the failure which has occurred in the vehicle through the use of a cellular phone or the like as a terminal device, even when not being in the vehicle. Also, a person other than the user (e.g., a person responsible at an automobile dealer) can check the failure which has occurred in the vehicle through the use of the terminal device. Thus, for example, when the alarm lamp of the vehicle turns off immediately after illuminating and the user has not recognized occurrence of the failure, the person other than the user can notify the user of the occurrence of the failure.

A third aspect of the invention relates to a vehicular diagnostic system, in which a vehicle and a center are connected so as to be able to communicate with each other, the vehicle transmits information regarding a failure in the vehicle to the center, and the center diagnoses the failure which has occurred in the vehicle, based on the information regarding the failure transmitted from the vehicle. The vehicle includes failure detecting means for detecting a failure which has occurred in a device mounted in the vehicle, failure information outputting means for obtaining and outputting failure information detected by the failure detecting means, failure information collecting means for collecting failure detailed information indicating details regarding the failure detected by the failure detecting means, failure notifying means for obtaining the failure information output from the failure information outputting means and for notifying a user of the failure information, and vehicle communication means for transmitting the failure information output from the failure information outputting means and the failure detailed information collected by the failure information collecting means to the center, and for receiving information related to the failure which has occurred in the device from the center. The center is provided with center communication means for receiving the failure information and the failure detailed information transmitted from the vehicle and for transmitting information regarding the failure indicated in the received failure information and the failure detailed information to the vehicle, failure specifics checking means for checking the specifics of the failure based on the failure information and the failure detailed information received by the center communication means, countermeasure information preparing means for preparing countermeasure information indicating countermeasures for the specifics of the failure checked by the failure specifics checking means, and storing means for accumulating and storing at least the failure information from among the failure information and the failure detailed information received by the center communication means.

Note that the vehicle and the center in the vehicle diagnostic system according to the third aspect are within the scope of the invention.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIGS. 4A to 4C are a flowchart of an abnormality information transmission notifying program performed by the vehicle, the center and an automobile dealer personal computer shown in FIG. 1;

FIG. 5 is a flowchart of an abnormality notification preparing routine performed by the center shown in FIG. 1;

FIG. 8 is a flowchart of a response command status determining routine performed by the vehicle shown in FIG. 1;

FIGS. 10A, 10B, and 10C are views for describing the display screen of the display unit when the vehicle receives an abnormality notification;

DETAILED DESCRIPTION OF THE PREFERRED EMBODIMENTS

Figure 1:
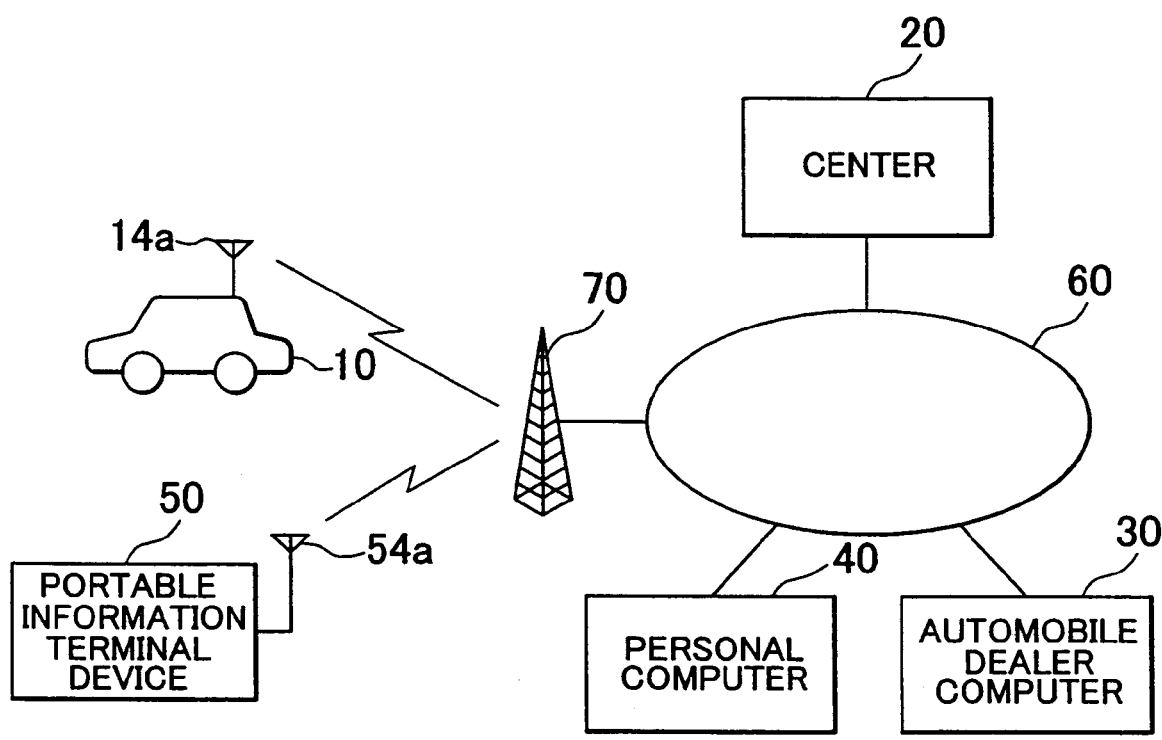
FIG. 1 is a block diagram schematically showing an entire vehicular diagnostic system according to an embodiment of the invention.

Hereafter, an embodiment of the invention will be described in detail with reference to accompanying drawings. FIG. 1 is a block diagram schematically showing a vehicular diagnostic system according to the embodiment. The vehicular diagnostic system includes a vehicle 10, a center 20 which can communicate with the vehicle 10, an automobile dealer computer 30 which is provided in an automobile dealer selling vehicles and performing servicing, a personal computer 40 and a portable information terminal device 50 which can be used by a user. The vehicle 10 and the portable information terminal device 50 can wirelessly communicate with a transmission site 70 connected to a network 60 (e.g., the Internet). The center 20, the automobile dealer computer 30 and the personal computer 40 are connected to the network 60.

Figure 2:
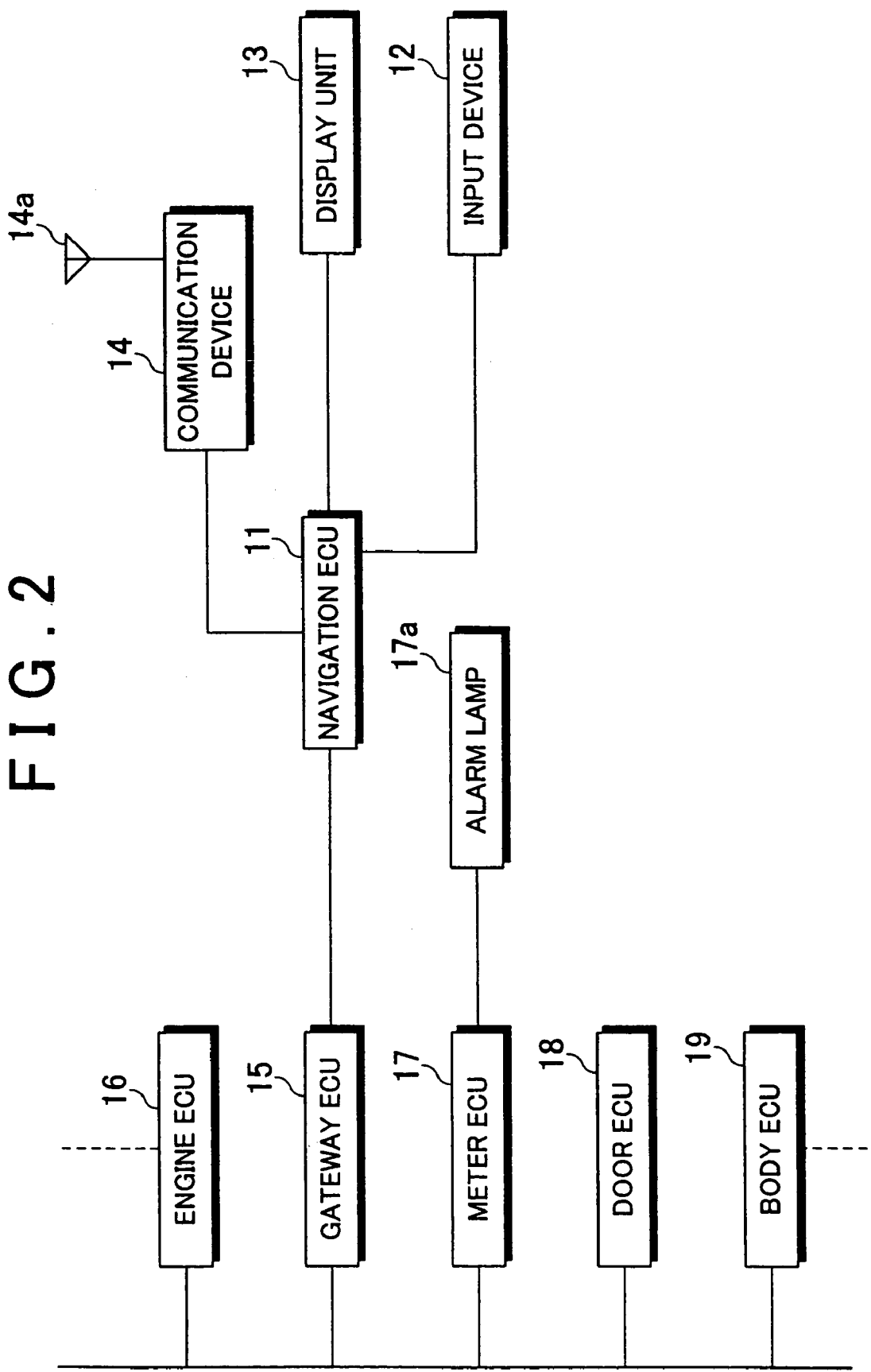
FIG. 2 is a block diagram schematically showing a vehicle shown in FIG. 1.

As shown in FIG. 2, the vehicle 10 includes a navigation ECU 11 which provides overall control of a navigation unit that searches for a route to a destination set by the user and that provides the obtained route by display or by voice. The navigation ECU 11 is a computer mainly including a CPU, ROM, RAM and the like. An input device 12, a display unit 13, and a communication device 14 are connected to the navigation ECU 11.

The input device 12 includes an operation switch provided near the display unit 13, a panel touch switch which is incorporated in the display unit 13 and which detects a touch operation of a display panel, and the like. An instruction from the user is input in the input device 12. The input device 12 then outputs information corresponding to the instruction input by the user to the navigation ECU 11. The display unit 13 includes a liquid crystal display and the like, and displays characters, graphics, and the like on the display panel based on the provided various types of information.

The communication device 14 is undetachably mounted in the vehicle 10, and can communicate with the center 20 via the transmission site 70. The communication device 14 is provided with identification information (hereinafter, referred to as MAC (Media Access Control) address information) for identifying the communication device 14 during manufacturing. Also, vehicle ID information (e.g., vehicle number information indicating a vehicle number assigned to the vehicle 10 during manufacture, and a registration number provided by the motor vehicle official) assigned to the vehicle 10 is stored in the communication device 14 in advance. By making a contract with the center 20, a user name, user ID information and a user password (hereinafter, these are collectively referred to as "user identification information") and mail address information used for communication with the center 20 are stored in the communication device 14 in advance. An antenna 14a which wirelessly communicates with the transmission site 70 is connected to the communication device 14.

A gateway ECU 15 and the navigation ECU 11 are connected so as to be able to communicate with each other via a network (e.g., LAN (Local Area Network)) built in the vehicle 10. The gateway ECU 15 is a computer mainly including a CPU, ROM RAM and the like. The gateway ECU 15 is connected to an engine ECU 16, a meter ECU 17, a door ECU 18, a body ECU 19 and the like so as to be able to communicate with the ECUs 16, 17, 18 and 19 via the network built in the vehicle 10. Each of the ECUs 16, 17, 18 and 19 is a computer mainly including a CPU, ROM and RAM. Other than the ECUs 16, 17, 18 and 19, various ECUs are mounted in the vehicle 10. In the embodiment, however, description will be made, taking the ECUs 16, 17, 18 and 19 as examples.

The gateway ECU 15 provides overall control of the flow of control signals for controlling various data shared by the ECUs 16, 17, 18 and 19, and cooperation among the ECUs 16, 17, 18 and 19. The gateway ECU 15 provides the meter ECU 17 with alarm lamp illumination information indicating an alarm lamp illumination request which is output when an abnormality has occurred in the devices whose operation is controlled by the ECUs 18 and 19, and provides overall control of the flow of the failure information (diagnosis information) indicating details of the abnormality which has occurred in the ECUs 16, 17, 18 or 19.

The engine ECU 16 controls the operation of the engine based on the data and signals detected by various sensors (e.g., an engine rotational speed sensor and a battery voltage sensor) attached to the engine and auxiliaries (not shown). The meter ECU 17 controls various types of information displayed on meter devices (not shown) based on the data and signals detected by various sensors (e.g., a vehicle speed sensor and a coolant temperature sensor). The meter ECU 17 controls illumination of a plurality of alarm lamps 17*a* based on the alarm lamp information output from the engine ECU 16 and alarm lamp illumination information output from the ECUs 18 and 19 via the gateway ECU 15, and notifies the user of an abnormality.

The door ECU 18 is attached to a door lock device (not shown), and controls the operation of the door lock device based on data and signals detected by various sensors (e.g., a remote control opening/closing detecting sensor and a door lock sensor). The body ECU 19 controls ON/OFF of the lamp based on signals input from various switches (e.g., a light control switch and a door courtesy lamp switch) attached to a vehicle body (body) (not shown).

Note that control performed by the ECUs 15, 16, 17, 18 and 19 is not limited to the above-mentioned control. Also, concrete processing programs and concrete control methods of the ECUs 16, 17, 18 and 19 are not related to the invention directly. Therefore, detailed description of the programs and methods is omitted in the specification.

Figure 3:
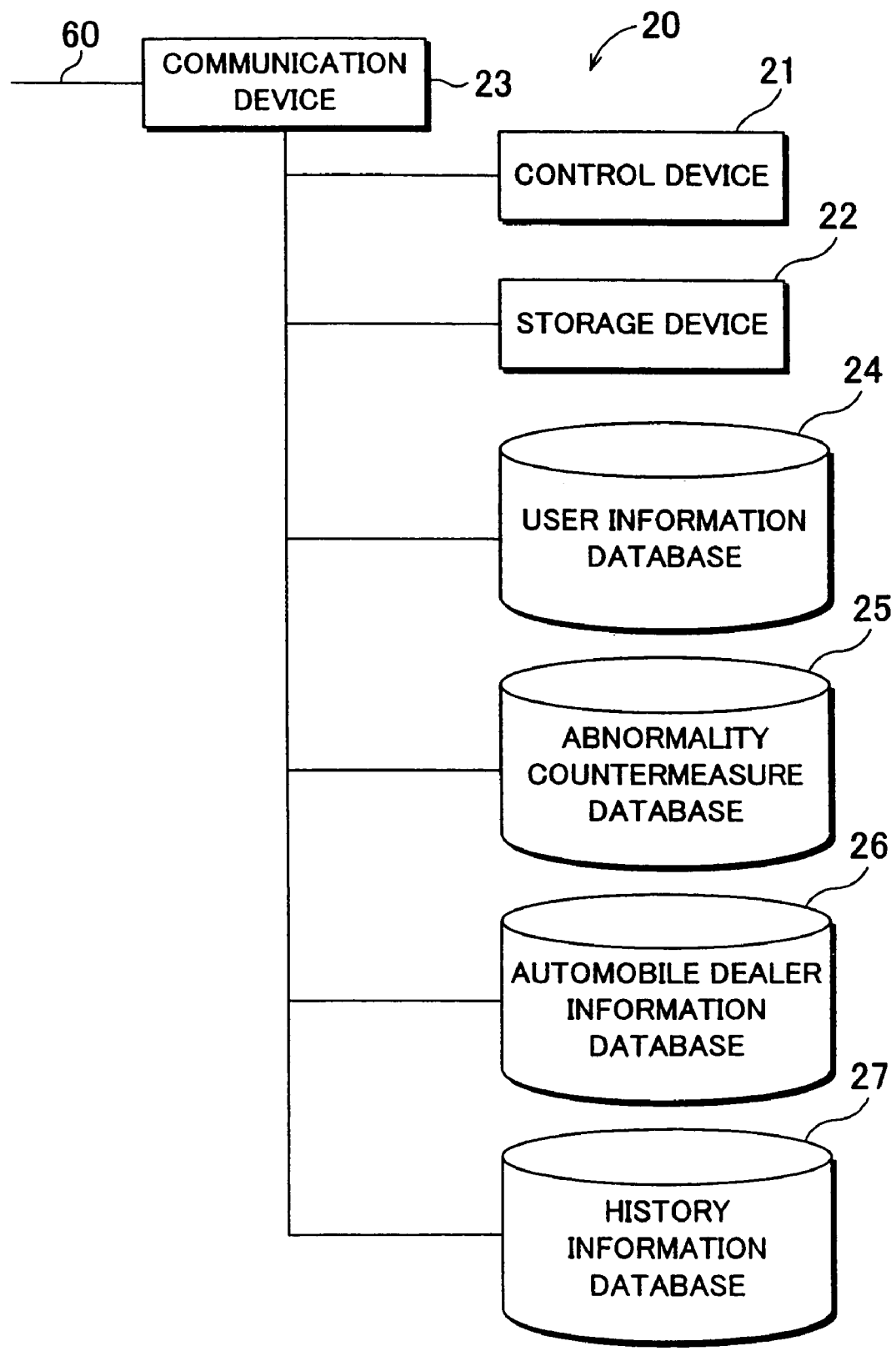
FIG. 3 is a block diagram schematically showing a center shown in FIG. 1.

As shown in FIG. 3, the center 20 is provided with a control device 21, a storage device 22 and a communication device 23 which are connected so as to be able to communicate with each other. The control device 21 includes a computer mainly provided with a CPU, ROM, RAM and the like, and provides overall control of the operation of the center 20. The storage device 22 includes a recording medium such as a hard disk, and a drive device for the recording medium, and stores various programs and various data. The communication device 23 is wired to the network 60 so as to perform wire communication with the automobile dealer computer 30 and the personal computer 40 which can be used by the user, and wirelessly communicate with the vehicle 10 and the portable information terminal device 50 via the transmission site 70.

A user information database 24, an abnormality countermeasure database 25, an automobile dealer information database 26 and a history information database 27 are built in the center 20. The databases 24, 25, 26 and 27 are connected to the network (e.g., LAN) built in the center 20, and is accessible from the control device 21.

The vehicle ID information regarding the vehicle 10, the MAC address information assigned to the communication device 14 of the vehicle 10, and the mail address information; the automobile dealer identification information indicating the automobile dealer which sold the vehicle 10; and the user identification information are linked to each other, and stored in the user information database 24. In order to allow for access from the personal computer 40 or the portable information terminal device 50, the MAC address information of the devices 40 and 50 and the mail address information used by the devices 40 and 50 for communication with the center 20, and the user identification information are linked to each other and stored in the user information database 24.

The abnormality countermeasure database 25, as win be described later in detail, stores base sentences of countermeasures to be notified to the user of the vehicle 10 (hereinafter, referred to as "default sentences") for each type of abnormalities indicated in the alarm lamp illumination information transmitted from the vehicle 10. An example of the default sentences is as follows; "an abnormality may have occurred in the system. Therefore, we will perform an inspection for safety. Please have your vehicle serviced. We apologize for the inconvenience". This is for the alarm lamp illumination information indicating an abnormality in the system.

The automobile dealer information database 26 stores business days, business hours and the like (hereinafter, referred to as "automobile dealer information") of each automobile dealer. The automobile dealer information can be updated by accessing the center 20 through the use of the automobile dealer computer 30. Also, the time at which an after-mentioned abnormality notification is transmitted to the user can be stored in the automobile dealer information database 26 in advance. The center 20 can provide the user of the vehicle 10 with various types of service corresponding to the business days and business hours of each automobile dealer, based on the information stored in the automobile dealer information database 26. For example, in the case of servicing of the vehicle 10, the information (e.g., an e-mail) for displaying a button, which is used for making a phone call to the automobile dealer that can provide the service, on the display unit 13 is transmitted and displayed, based on the business days and business hours of the automobile dealer.

As described later in detail, the history of the alarm lamp illumination transmitted from the vehicle 10 and the countermeasures corresponding to the illuminated alarm lamp, and the vehicle D information and the user identification information are linked to each other and stored in the history information database 27.

The automobile dealer computer 30 mainly includes a CPU, ROM, RAM and the like, and is provided with an input device, a display unit, a control device, a storage device and a communication device. The automobile dealer computer 30 can access the center 20 through the operation performed by a person responsible at the automobile dealer. The automobile dealer computer 30 transmits various types of information (the abnormality countermeasure information, the automobile dealer information and the like) to the center 20, and receives various types of information (the alarm lamp illumination information, the failure information and the like) from the center 20. The person responsible at the automobile dealer can search for and obtain the entire information regarding the center 20 (e.g., the history information database 26) by accessing the center 20 through the use of the automobile dealer computer 30. The vehicle ID information regarding the vehicle sold at the automobile dealer and the customer information including the name of the vehicle user are linked to each other and stored in the storage device of the automobile dealer computer 30.

The personal computer 40 which can be used by the user mainly includes a CPU, ROM, RAM and the like, and is provided with an input device, a display unit, a control device, a storage device and a communication device. The personal computer 40 can access the center 20 through the operation performed by the user, and obtains the alarm lamp information and the countermeasures from the history information database 27 of the center 20.

The portable information terminal device 50 mainly includes a CPU, ROM, RAM and the like, and is provided with an input device, a display unit, a control device, a storage device and a communication device. The portable information terminal device 50 is compact in size so as to be portable. An antenna 54a, which enables wireless communication with the transmission site 70, is provided in the communication device of the portable information terminal device 50. The portable information terminal device 50 can access the center 20 through the operation performed by the user, and obtains the alarm lamp illumination information and the countermeasures from the history information database 27 of the center 20. As the portable information terminal device 50, a cellular phone, a portable personal computer having a communication function, a personal digital assistant (PDA) or the like can be employed.

In the thus configured vehicular diagnostic system, communication among the communication device 14 of the vehicle 10, the center 20, the automobile dealer computer 30, the personal computer 40 and the portable information terminal device 50 is wirelessly performed via the antennas 14a and 54a, and the transmission site 70, or performed via wire through the network 60. This communication is performed in a normal method, and does not have distinctive characteristics. Therefore, in the description below, when the term, "transmission" or "reception" is used, a suitable method for communication is employed for transmission/reception.

Next, an operation of the thus configured vehicular diagnostic system will be described in detail. When an ignition switch (not shown) is turned ON by the user of the vehicle 10, the ECUs 11, 15, 16, 17, 18 and 19 mounted in the vehicle 10 respectively control the operation of the devices. The navigation ECU 11, the gateway ECU 15 and the meter ECU 17 repeatedly perform an abnormality information transmission notifying program shown in FIGS. 4A to 4C at predetermined short intervals in cooperation with each other. In the abnormality information transmission notifying program, the routine is started in step S10, and the meter ECU 17 determines whether an abnormality has occurred in the vehicle 10 in step S11. The determination will be described in detail, taking the case where an abnormality has occurred in the engine as an example.

The engine ECU 16 controls the operation state of the engine based on signals output from the various sensors attached to the engine and the auxiliaries. In the case where the engine is operating, when a signal indicative of an engine rotational speed output from the engine rotational speed sensor indicates an abnormality, the engine ECU 16 outputs the alarm lamp illumination information to the meter ECU 17 such that the alarm lamp indicating an abnormality in the engine illuminates. The door ECU 18 and the body ECU 19 output the alarm lamp illumination information to the meter ECU 17 via the gateway ECU 15.

The meter ECU 17 recognizes occurrence of an abnormality in the vehicle 10 by obtaining the alarm lamp illumination information output from the engine ECU 16. When obtaining the alarm lamp illumination information, the meter ECU 17 makes an affirmative determination in step S11 since an abnormality has occurred in the vehicle 10, afterwhich step S12 is performed. On the other hand, when not obtaining the alarm lamp illumination information, the meter ECU 17 makes a negative determination in step S11 since an abnormality has not occurred in the vehicle 10. Then, the abnormality information transmission notifying program temporarily ends in step S24.

In step S12, the meter ECU 17 performs illumination control of the alarm lamp 17a corresponding to the alarm lamp illumination information obtained in step S11. The user can thus recognize occurrence of an abnormality in the vehicle 10.

The illumination operation of the alarm lamp can be performed as described below. The meter ECU 17 obtains information (bit data) regarding illumination of the alarm lamp output from the ECUs 16, 18, and 19, and stores the information in the RAM. The meter ECU 17 then compares the bit data stored in the RAM with the bit data newly output from the ECUs 16, 18 and 19. If there is a change in the bit data, the meter ECU 17 illuminates the corresponding alarm lamp. The alarm lamp can be thus illuminated considerably easily.

Figure 9A:
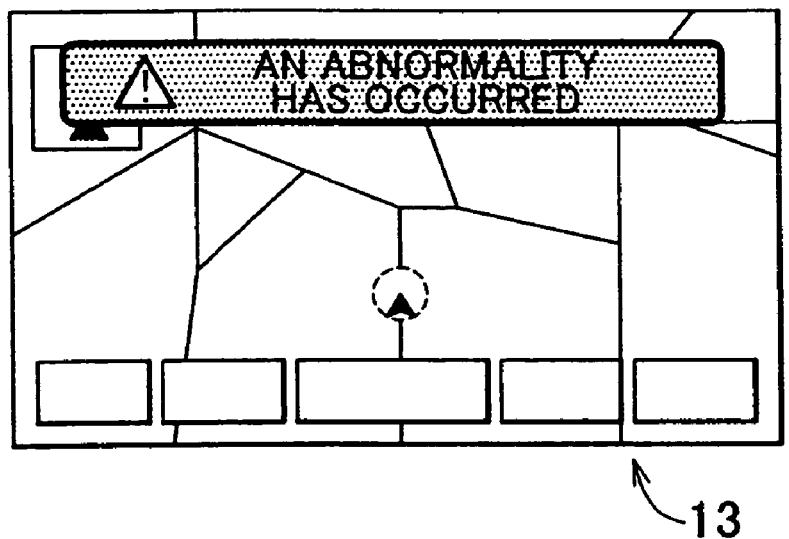
FIGS. 9A and 9B are views for describing a display screen of a display unit when an abnormality occurs in the vehicle.
Figure 9B:
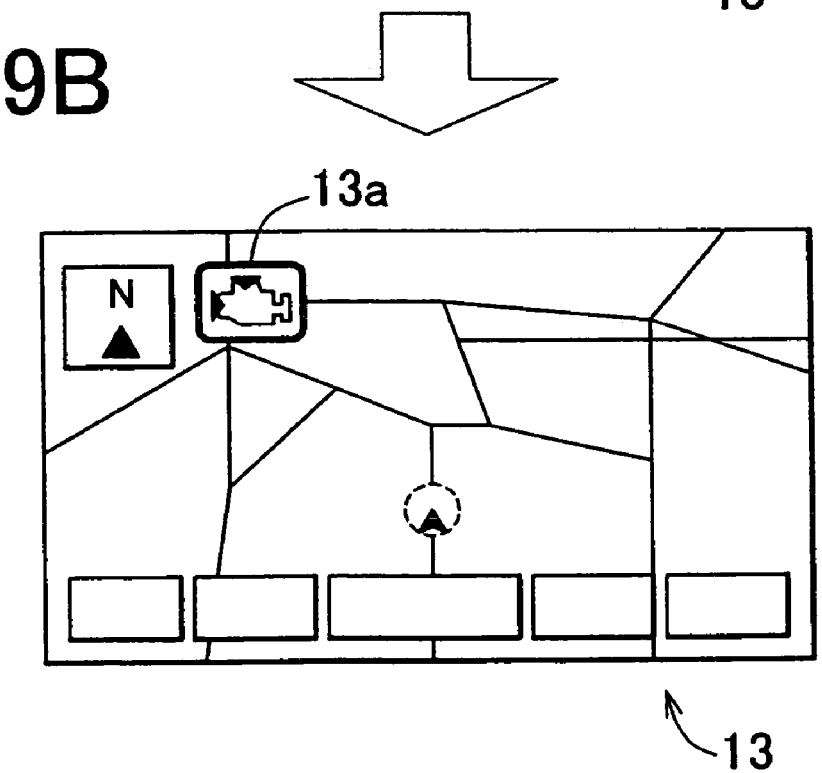

The meter ECU 17 provides the obtained alarm lamp illumination information to the navigation ECU 11 via the gateway ECU 15. The navigation ECU 11 obtains the provided alarm lamp illumination information, and provides the obtained alarm lamp illumination information to the display unit 13. When obtaining the provided alarm lamp illumination information, the display unit 13 displays a message indicating occurrence of an abnormality in the vehicle 10 on a liquid crystal display, as shown in FIG. 9A. When a predetermined time has elapsed since the massage was displayed, as shown in FIG. 9B, the display unit 13 deletes the message and displays an alarm icon 13a indicating occurrence of an abnormality in the engine on the liquid crystal display so as to continue notifying the user of the occurrence of the abnormality.

After step S12 is performed, the navigation ECU 11 transmits the alarm lamp illumination information, the vehicle ID information and the user ID information to the center 20 using the communication device 14 in step S13. More particularly, the navigation ECU 11 provides the communication device 14 with the alarm lamp illumination information obtained in step S12, and instructs the communication device 14 to transmit the vehicle ID information and the user identification information as well as the alarm lamp illumination information. The communication device 14 obtains the alarm lamp illumination information, and transmits the alarm lamp illumination information, the vehicle ID information and the user identification information to the center 20. At this time, the communication device 14 also transmits the MAC address information assigned thereto to the center 20.

In the center 20, in step C10, the alarm lamp illumination information, the vehicle ID information, the user identification information and the MAC address information of the communication device 14 transmitted in S13 are received by the control device 21, and temporarily stored in the RAM (not shown), afterwhich step C11 is performed.

In step C11, the control device 21 transmits the alarm lamp illumination information temporarily stored in the RAM in step C10 to the automobile dealer computer 30. This transmission process will be described in detail. The control device 21 obtains the vehicle ID information and the user identification information temporarily stored in the RAM in step C10, and searches the user information database 24 based on the obtained information. The control device 21 then obtains the stored automobile dealer information linked to the vehicle ID information and the user identification information. When obtaining the automobile dealer information, the control device 21 transmits the alarm lamp illumination information and the vehicle ID information to the automobile dealer indicated in the automobile dealer information (more specifically, the automobile dealer computer 30) via the communication device 23 and the network 60.

In the automobile dealer, in step D10, the alarm lamp illumination information and the vehicle ID information transmitted from the center 20 in step C11 are received by the automobile dealer computer 30, and temporarily stored in the RAM (not shown). In this case, when receiving the alarm lamp illumination information and the vehicle ID information from the center 20, the automobile dealer computer 30 displays a message indicating reception of the alarm lamp illumination information, for example, "alarm lamp illumination information is received", on the display screen of the display unit (not shown) so as to notify the person responsible or the engineer at the automobile dealer (hereinafter, referred to as the "person(s) responsible") of the reception of the information. When the message is displayed, the person(s) responsible operates the automobile dealer computer 30, and decides the abnormality countermeasure information to be transmitted to the vehicle 10 so as to deal with the abnormality indicated by the illuminated alarm lamp.

The abnormality countermeasure information will be described in detail. The abnormality countermeasure information is prepared by each automobile dealer. More particularly, the person(s) responsible operates the automobile dealer computer 30 and accesses the abnormality countermeasure database 25 of the center 20 in advance so as to obtain the default sentences stored in the abnormality countermeasure database 25. The person(s) responsible adds necessary items (e.g., a greeting) to the default sentences obtained from the center 20 so as to prepare the abnormality countermeasure information specific to the automobile dealer. For example, as a necessary item, a greeting such as "we would like to express our thanks for your loyal patronage" is added to the default sentences, "an abnormality may have occurred in the system. Therefore, we will perform an inspection for safety. Please have your vehicle serviced. We apologize for the inconvenience". The abnormality countermeasure information is thus prepared and stored in the storage device. Note that it is obvious that the abnormality countermeasure information is prepared for each type of abnormalities.

When receiving the alarm lamp illumination information in step D10, the person(s) responsible selects and decides the optimum abnormality countermeasure information in all the abnormality countermeasure information stored in the storage device, for the received alarm lamp illumination information. Also, by referring to the customer information stored in the storage device of the automobile dealer computer 30, the person(s) responsible can select the method for handling the user name attached to the abnormality notification prepared by the "abnormality notification preparing routine" performed by the center 20.

When the abnormality notification is transmitted to the vehicle 10, there is a possibility that the vehicle 10 is running and the abnormality notification is output by voice. There may be various ways to read the user name, and the user may feel discomfort if the user name is read wrongly. Therefore, the person(s) responsible selects whether to read the user name attached to the transmitted abnormality notification when deciding the abnormality countermeasure information. The information indicative of the selection made by the person(s) responsible is added to the decided abnormality countermeasure information. The person(s) responsible can designate the time at which the abnormality notification is transmitted for the abnormality countermeasure information. The center 20 can thus transmit the abnormality notification at the designated time.

When the optimum abnormality countermeasure information is decided by the person(s) responsible, in step D11, the automobile dealer computer 30 transmits the decided abnormality countermeasure information to the center 20 via the network 60.

In the center 20, in step C12, the abnormality countermeasure information transmitted from the automobile dealer computer 30 in step D11 is received by the control device 21, and temporarily stored in the RAM (not shown), afterwhich step C13 is performed. In step C13, the alarm lamp illumination information received in step C10, the abnormality countermeasure information received in step C12 and the date and time when the alarm lamp illumination information is received are linked to each other, and stored in the history information database 27 by the control device 21.

After step C13 is performed, the control device 21 performs the "abnormality notification preparing routine" in step C14. As shown in FIG. 5, the "abnormality notification preparing routine" is started in step C100. In step C101, the control device 21 determines whether the illuminating alarm lamp illuminates for the first time. Namely, the control device 21 searches for the alarm lamp illumination information stored in the history information database 27 using the alarm lamp illumination information received in step C10. As a result of the search, when the same alarm lamp illumination information is not stored in the history information database 27, it can be determined that the alarm lamp illuminates for the first time. Therefore the control device 21 makes an affirmative determination, and step C103 is then performed.

On the other hand, as a result of the search of the history information database 27, when the same alarm lamp illumination information is stored, it can be determined that the alarm lamp has illuminated before, that is, this is not the first time the alarm lamp illuminates. Therefore, the control device 21 makes a negative determination, and step C102 is then performed. In step C102, the control device 21 determines whether the present alarm lamp illumination information is received after a predetermined time (e.g., 7 days) has elapsed since the previous alarm lamp illumination information was received. More particularly, the control device 21 compares the date and time when the present alarm lamp illumination information is received with the date and time, which is stored in the history information database 27, when the previous alarm lamp illumination information was received. The control device 21 thus determines whether the predetermined time has elapsed since the previous alarm lamp illumination information was received.

When it is determined that the predetermined time has elapsed since the previous alarm lamp illumination information was received, the control device 21 makes an affirmative determination, and step C103 is then performed. On the other hand, when it is determined that the predetermined time has not elapsed since the previous alarm lamp illumination information was received, the control device 21 makes a negative determination, and the "abnormality notification preparing routine" ends in step C107.

By determining whether the present alarm lamp illumination information is received after the predetermined time has elapsed since the previous alarm lamp illumination information was received, the same abnormality notification can be prevented from being transmitted to the vehicle 10 more frequently than is necessary. This prevents the user from receiving the same abnormality notification more frequently than is necessary, which minimizes confusion felt by the user.

In step C103, the control device 21 prepares the abnormality notification (e-mail) to be transmitted to the vehicle 10. The preparation of the abnormality notification will be described below in detail. The control device 21 prepares the abnormality notification in a predetermined format using an abnormality notification format set in advance (e.g., HTML format, or XML format). The control device 21 obtains the user identification information temporarily stored in the RAM, and searches the user information database 24 using the user identification information. Then, in all the user identification information stored in the user information database 24, the control device 21 searches for the user identification information matching the user identification information temporarily stored in the RAM, and extracts the matching user identification information. The control device 21 then obtains the mail address linked to the extracted user identification information.

Next, the control device 21 obtains the abnormality countermeasure information received from the automobile dealer computer 30 in step C12 and temporarily stored in the RAM. The control device 21 then incorporates the information indicating the user name, which is included in the user identification information, and the abnormality countermeasure information into the abnormality notification format. Thus, the user name can be indicated in the abnormality notification, when the abnormality notification is transmitted to the vehicle 10 and indicated. The control device 21 thus prepares the abnormality notification, and step C104 is then performed.

The number of the pieces of the alarm lamp illumination information transmitted from the vehicle 10 is not limited to one. Various types of the alarm lamp illumination information may be transmitted. In this case, the control device 21 classifies the alarm lamp illumination information into plural groups depending on the type of information in advance (e.g., the alarm lamp illumination information related to maintenance and the alarm lamp illumination information related to an abnormality in the system). The control device 21 then incorporates the abnormality notifications for the plural pieces of alarm lamp illumination information into one piece of abnormality notification, according to the following rules.

When receiving plural pieces of alarm lamp illumination information related to maintenance, the control device 21 incorporates these pieces of information into one piece of maintenance warning information, and automatically prepares the abnormality notification for the maintenance warning information. At this time, since having received the abnormality countermeasure information for each alarm lamp illumination information from the automobile dealer computer 30, the control device 21 prepares the abnormality notification including all the abnormality countermeasure information.

When receiving plural pieces of alarm lamp illumination information related to an abnormality in the system, the control device 21 incorporates these pieces of information into one piece of system warning information, and automatically prepares the abnormality notification for the system warning information. At this time, since having received the abnormality countermeasure information for each alarm lamp illumination information from the automobile dealer computer 30, the control device 21 prepares the abnormality notification including all the abnormality countermeasure information.

When receiving both the alarm lamp illumination information related to maintenance and the alarm lamp illumination information related to an abnormality in the system, the control device 21 incorporates these pieces of information into one piece of system warning information. This is because the alarm lamp illumination information related to an abnormality in the system has a larger effect on the running state of the vehicle than the alarm lamp illumination information related to maintenance. The control device 21 then automatically prepares the abnormality notification for the system warning information. At this time, the control device 21 has received the abnormality countermeasure information for the alarm lamp illumination information related to an abnormality in the system from the automobile dealer computer 30. Therefore, the control device 21 prepares the abnormality notification by including all the received abnormality countermeasure information, and including the state where the abnormality has occurred based on the alarm lamp illumination information related to maintenance.

Incorporating plural pieces of alarm lamp illumination information into one abnormality notification reduces the number of times that the abnormality notification is transmitted to the vehicle 10. Communication cost can be thus reduced, which prevents confusion over the abnormality notification felt by the user.

Next, in step C104, the control device 21 determines whether the user name included in the abnormality notification prepared in step C103 is set to be read. Namely, the control device 21 detects selection information about whether the user name is read, the selection information being added to the abnormality countermeasure information by the person(s) responsible at the automobile dealer. When the selection information indicates that the user name is to be read, the control device 21 makes an affirmative determination, and step C105 is then performed.

In step C105, the control device 21 makes the setting such that the user name included in the abnormality notification prepared in step C103 is read. In the embodiment, the abnormality notification is prepared in the XML format or the HTML format. Therefore, when the abnormality notification is transmitted to the vehicle 10 and output by voice as it is, the user name can be read. Accordingly, when the abnormality notification is prepared in such a format, the setting process in step C105 may be a process where the setting of the abnormality notification is not changed. After step C105 is performed, the "abnormality notification preparing routine" ends in step C107.

On the other hand, when the detected selection information indicates that the user name is not to be read, the control device 21 makes a negative determination in step C104, and step C106 is then performed. In step C106, the control device 21 makes the setting such that the user name included in the abnormality notification prepared in step C103 is not read. Since the abnormality notification is prepared in the XML format or the HTML format, by applying a predetermined command (e.g., W user name W) to the description corresponding to the user name, setting is made such that the user name is not read. After step C106 is performed, the "abnormality notification preparing routine" ends in step C107.

Figure 4A:
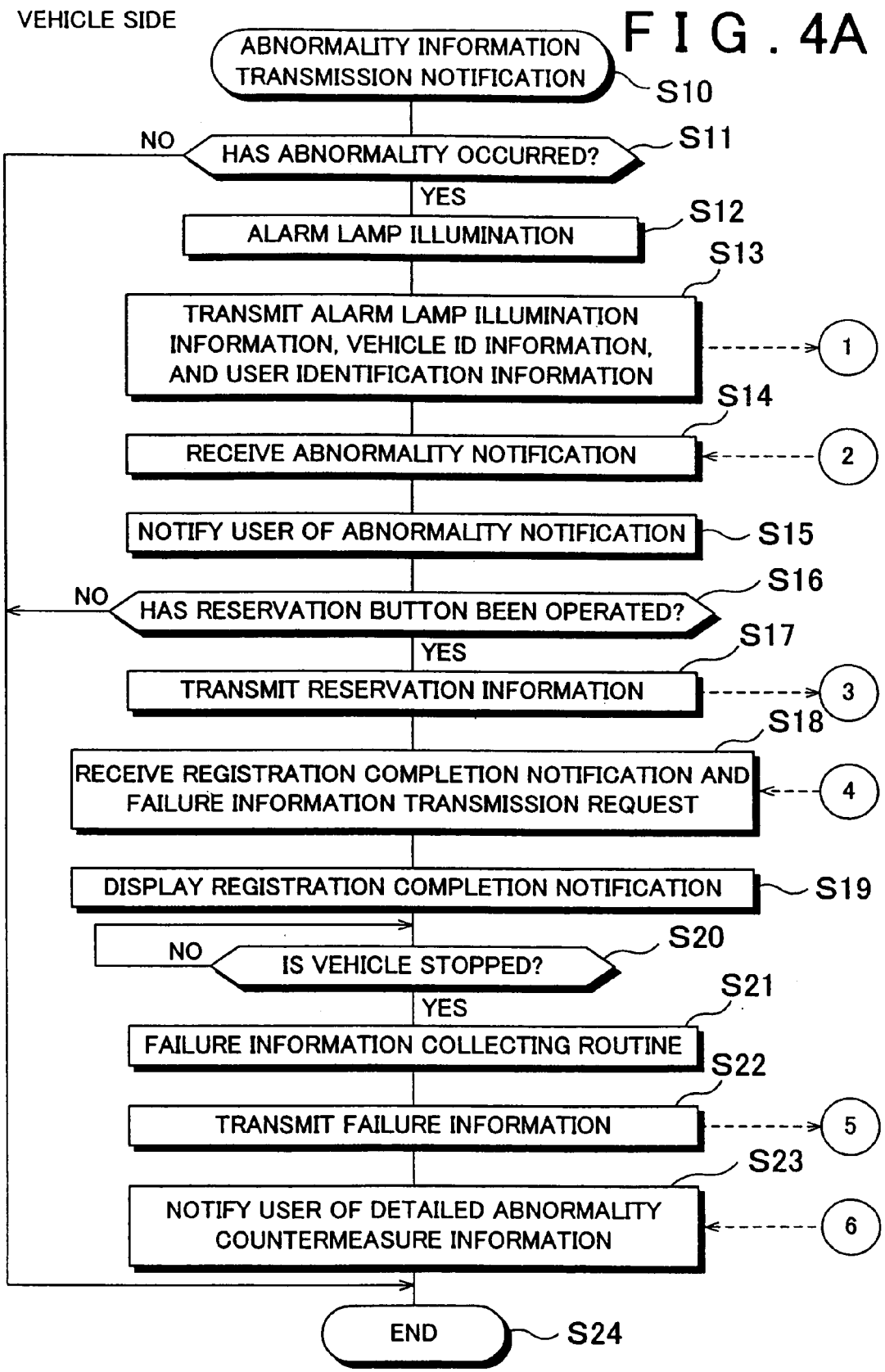
Figure 4B:
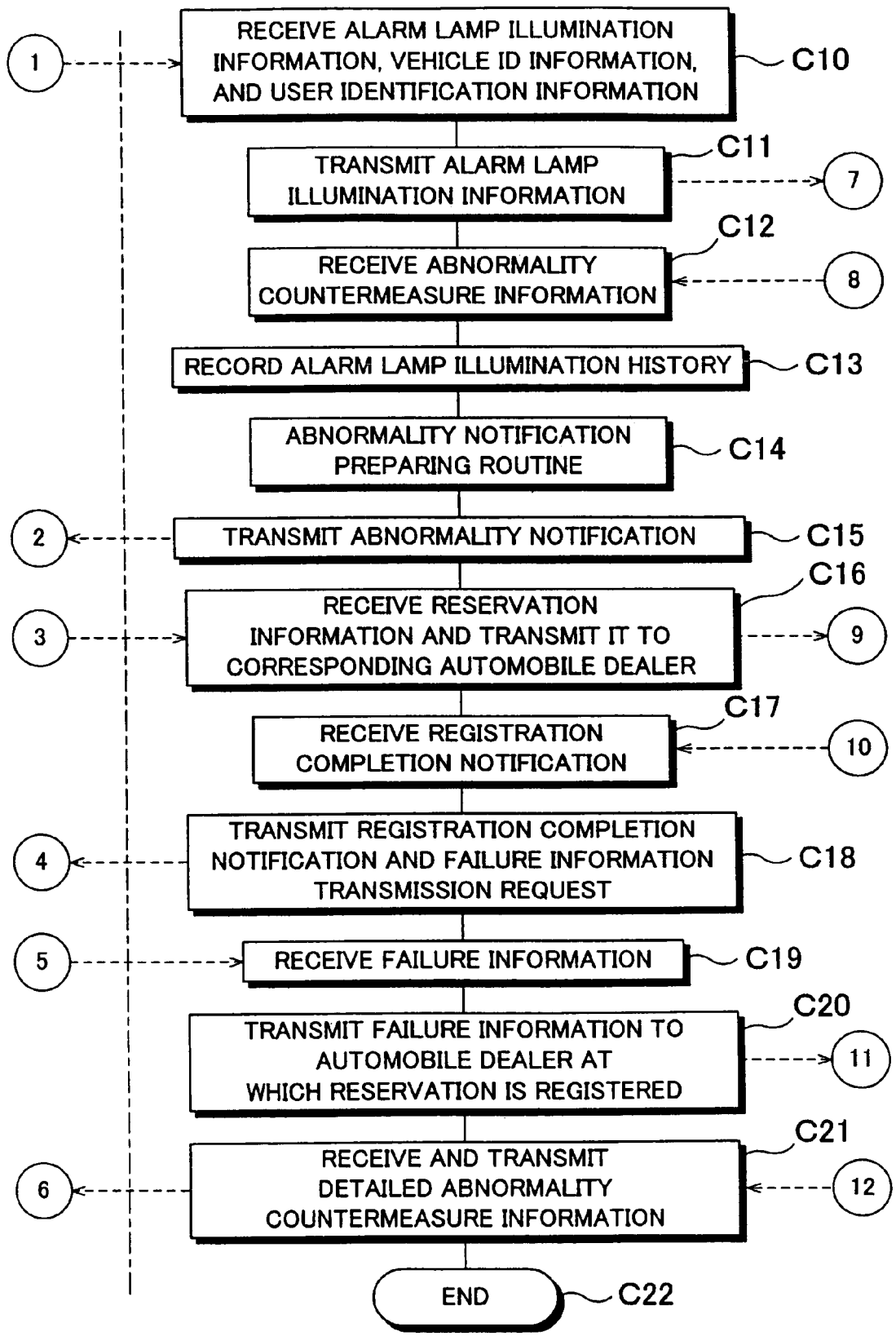

Then, the process returns to the flowchart in FIGS. 4A to 4C. After the "abnormality notification preparing routine" is performed in step C14, step C15 is performed. In step C15, the control device 21 transmits the abnormality notification prepared in step C14 to the vehicle 10. Namely, the control device 21 transmits the abnormality notification to the vehicle 10 via the communication device 23 and the transmission site 70 connected to the network 60. In this transmission, the control device 21 can check the time at which the abnormality notification stored in the automobile dealer information database 26 may be transmitted, and then transmit the abnormality notification. In this case, the control device 21 transmits the abnormality notification to the vehicle 10 at the transmission time set in advance. Accordingly, for example, when the user designates the abnormality notification transmission time and notifies the automobile dealer of the designated time in advance, the user can receive the abnormality notification at the designated time. Therefore, the user can suitably receive the abnormality notification.

In the vehicle 10, in step S14, the communication device 14 receives the abnormality notification transmitted in step C15, and provides the received abnormality notification to the navigation ECU 11. When obtaining the abnormality notification from the communication device 14, the navigation ECU 11 notifies the user of the obtained abnormality notification in step S15. More particularly, the navigation ECU 11 provides the abnormality notification to the display unit 13, and instructs the display unit 13 to display the abnormality notification on the liquid crystal display. As shown in FIG. 10A, the display unit 13 displays a message indicating that the abnormality notification is received on the liquid crystal display according to the instruction. When an instruction is made such that the abnormality notification should be checked through the touch operation performed by the user (the user touches the button indicating "YES"), the display unit 13 displays the abnormality notification provided by the navigation ECU 11, as shown in FIG. 10B. Thus, the user can check the information regarding the abnormality which has occurred in the vehicle 10 and the countermeasures for the abnormality. In this case, the user name is indicated in the displayed abnormality notification. Note that, in FIGS. 10B, 10C, 11 and 12, the words, phrase and sentences, such as "an abnormality may have occurred in the system. Please stop the vehicle at a safe place and make contact with us. We apologize for your inconvenience." and words are indicated outside the screen of the display unit 13, using outgoing lines, due to limitations of space. However, these sentences, phrase and words are actually indicated on the screen.

The abnormality notification in FIG. 10B can be displayed through the touch operation of the display unit 13 only when the vehicle 10 is stopped. Therefore, when the user performs touch operation of the liquid crystal display while the vehicle 10 is running, a message is displayed, as shown in FIG. 10C, indicating that the abnormality notification shown in FIG. 10B cannot be displayed while the vehicle is running. When the vehicle is running, the user can make an instruction such that the abnormality notification is output by voice using a voice recognition device (not shown). This also enables the user to check the abnormality notification. In this case, when setting is made such that the user name included in the abnormality notification is read, the user name is output by voice. On the other hand, when setting is made such that the user name is not read, the user name is not output by voice.

After step S15 is performed, in step S16, the navigation ECU 11 determines whether the touch operation of a reservation button 13b shown in FIG. 10B is performed by the user. In this case, it is obvious that the user cannot make a reservation through the touch operation of the reservation button 13b if the vehicle 10 is not stopped. The reservation button 13b is used for reserving the date and time when the vehicle 10 is brought to the automobile dealer for servicing. When the touch operation of the reservation button 13b is performed, the navigation ECU 11 makes an affirmative determination, afterwhich step S17 is performed.

On the other hand, when the touch operation of the reservation button 13b is not performed by the user within a predetermined time (e.g., 30 seconds), the navigation ECU 11 makes a negative determination in step S16. The abnormality information transmission notifying program temporarily ends in step S24.

When the abnormality information transmission notifying program thus ends, the after-mentioned failure information (diagnostic information) is not transmitted to the center 20 and the automobile dealer. Therefore, by incorporating a command for transmitting the failure information (diagnostic information) into an operation button (e.g., "return" button and "forward" button) provided in an advertisement transmitted arbitrarily by the center 20, step S20 and the following steps in the after-mentioned abnormality information transmission program can be performed due to the touch operation of the operation button performed by the user.

When the command is incorporated into the operation button and the failure information (diagnostic information) is transmitted, the following conditions need to be satisfied in order to minimize unnecessary communication. The conditions are as follows: (a); the center 20 transmits the present abnormality notification within, for example, four weeks after the previous abnormality notification was transmitted, and also, received the same alarm lamp illumination information as the present abnormality notification within, for example, two weeks before the present abnormality notification is transmitted, and (b); for example, four or more weeks have elapsed since the center 20 received the failure information (diagnostic information) related to the alarm lamp illumination information.

The condition (a) is used for identifying the state where the same alarm lamp illumination information is frequently transmitted to the center 20, and the center 20 repeatedly transmits the abnormality notification (as mentioned above, the intervals of seven days or more are maintained, though). The condition (b) is used for identifying the state where, although the center 20 received the failure information (diagnostic information) related to the same alarm lamp illumination information, the failure information (diagnostic information) becomes old due to the lapse of the predetermined time. In this case, due to the condition (b), the vehicle 10 does not transmit the failure information (diagnostic information) to the center 20 before the predetermined time (four weeks) elapses after the failure information (diagnostic information) is transmitted to the center 20.

When the above-mentioned conditions (a) and (b) are satisfied, the control device 21 of the center 20 incorporates the command into an advertisement or the like, and transmits it to the vehicle 10. When the touch operation of the operation button is performed by the user, the navigation ECU 11 and the gateway ECU 15 perform after-mentioned step S20 and the following steps. Thus, even when the touch operation of a reservation button 13b is not performed by the user, the center 20 and the automobile dealer can obtain the failure information (diagnostic information) required for servicing. Even in this case, it is obvious that the touch operation by the user can be performed only when the vehicle is stopped.

In step S17, the navigation ECU 11 provides the communication device 14 with the reservation information indicating that the touch operation of the reservation button 13b is performed, and instructs the communication device 14 to transmit the reservation information to the center 20. The communication device 14 transmits the reservation information to the center 20 according to the instruction. In the transmission of the reservation information, the communication device 14 transmits the MAC address information thereof along with the reservation information.

In the center 20, in step C16, the reservation information transmitted in step S17 and the MAC address information are received by the control device 21, and temporarily stored in the RAM. The control device 21 searches for and extracts the MAC address information matching the MAC address information stored in the RAM in all the MAC address information stored in the user information database 24, using the MAC address information temporarily stored in the RAM. The control device 21 then obtains the stored automobile dealer identification information linked to the extracted MAC address information.

Next, the control device 21 searches the automobile dealer information database 26 using the obtained automobile dealer identification information, and obtains the automobile dealer information regarding the automobile dealer identified by the automobile dealer identification information. The control device 21 then checks the business days and business hours of the automobile dealer, and transmits the reservation information to the automobile dealer computer 30.

When it is found, as a result of checking the business days and business hours of the automobile dealer, that the reservation cannot be made, for example, the control device 21 can receive the present location information regarding the vehicle 10 from the navigation ECU 11 of the vehicle 10 and notify the user of an automobile dealer near the present location indicated in the present location information. The control device 21 can search the automobile dealer database 26, and transmit the information regarding the automobile dealer which can be reserved so as to notify the user of the information.

The automobile dealer computer 30 obtains the reservation information transmitted in step C16 and resisters the servicing reservation in step D12, afterwhich step D13 is performed. In step D13, the automobile dealer computer 30 transmits the registration completion notification for the user, indicating that registration of servicing is completed, to the center 20.

In the center 20, the control device 21 receives the registration completion notification transmitted from the automobile dealer computer 30 in step D13 and the failure information transmission request in step C17, and step C18 is then performed. In step C18, the control device 21 transmits the received registration completion notification and the failure information transmission request to the vehicle 10. The failure information transmission request is transmitted such that detailed information regarding an abnormality which has occurred in the vehicle 10, that is, the failure information (diagnostic information) is transmitted.

In the vehicle 10, in step S18, the communication device 14 receives the registration completion notification and the failure information transmission request transmitted in step C18, and provides the received information to the navigation ECU 11.

In step S19, the navigation ECU 11 provides the display unit 13 with the registration completion notification provided in step S18. The display unit 13 displays the provided registration completion notification on the liquid crystal display. The user can thus check completion of the servicing reservation of the vehicle 10.

In step S20, the navigation ECU 11 determines whether the vehicle 10 is stopped via the gate way ECU 15, using the various data output from the ECUs 16, 17, 18 and 19 via the gateway ECU 15. The navigation ECU 11 repeatedly performs step S20 until it is determined that the vehicle 10 is stopped. When it is determined that the vehicle 10 is stopped, the navigation ECU 11 makes an affirmative determination, and step S21 is then performed.

Figure 6:
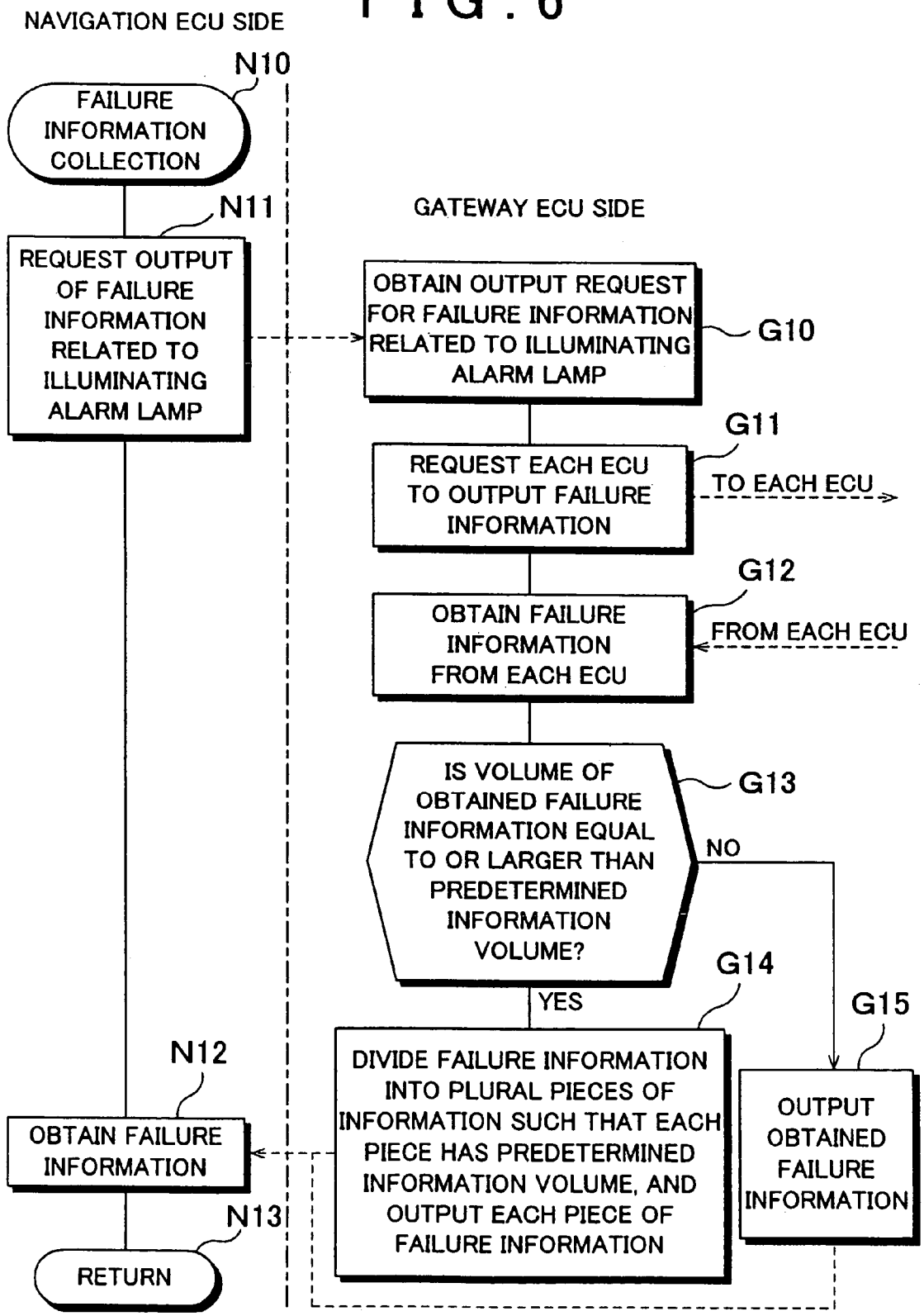
FIG. 6 is a flowchart of a failure information collecting routine performed by a navigation ECU and a gateway ECU mounted in the vehicle shown in FIG. 1.

In step S21, the navigation ECU 11 and the gateway ECU 15 perform the "failure information collecting routine" shown in FIG. 6 in cooperation with each other. The "failure information collecting routine" is used for collecting the failure information (diagnostic information). The diagnostic information is output from each of the ECUs 16, 17, 18 and 19 mounted in the vehicle 10. Therefore, when the routine is performed while the vehicle is running, loads may be placed on the ECUs 16, 17, 18 and 19. Accordingly, the "failure information collecting routine" is performed while the vehicle 10 is stopped.

The "failure information collecting routine" is started in step N10. In step N11, the navigation ECU 11 requests the gateway ECU 15 to output the failure information related to the alarm lamp illumination information based on the failure information transmission request received in step S18.

In step G10, the gateway ECU 15 obtains the output request provided from the navigation ECU 11 in step N11, and step G11 is then performed. In step G11, the gateway ECU 15 outputs the output request signal to the ECU, in which an abnormality related to the alarm lamp illumination information has occurred, among the ECUs 16, 17, 18 and 19 via the network built in the vehicle such that the diagnostic information is output. The diagnostic information includes detection values obtained by various sensors, the operation state data of devices controlled by the ECUs, and the like. The diagnostic information is stored in the RAM (not shown) of each of the ECUs 16, 17, 18 and 19.

The navigation ECU 11 and the gateway ECU 15 check whether the failure information transmission request transmitted from the center 20 is accidentally changed to another command through communication in cooperation with each other, in order to prevent unnecessary operation due to the other command. When another command transmitted from the center 20 is accidentally changed to the failure information transmission request through communication, the gateway ECU 15 does not output the request signal to the ECUs 16, 17, 18 and 19.

In step G12, the gateway ECU 15 obtains the diagnostic information. Among the ECUs 16, 17, 18 and 19, the ECU, in which an abnormality related to the alarm lamp illumination information has occurred, outputs the diagnostic information stored in the RAM thereof to the gateway ECU 15 via the network. The gateway ECU 15 obtains the output diagnostic information, and step G13 is then performed.

In step G13, the gateway ECU 15 determines whether the data volume of the diagnostic information obtained in step G12 is equal to or larger than a predetermined information volume. As mentioned above, the diagnostic information includes the detection values obtained by various sensors and the operation state data. Accordingly, for example, when abnormalities have occurred in two or more devices, the data volume of the diagnostic information to be obtained may be enormous. Due to the flow of the enormous volume of the diagnostic information through the network built in the vehicle 10, the network may be saturated. When the enormous volume of the diagnostic information is transmitted to the center 20 and the automobile dealer, communication time and communication costs are also increased. Particularly, due to an increase in the communication time, a failure may occur in the communication between another vehicle and the center 20. In this case, the predetermined information volume is set in consideration of communication time and communication costs. When the determination is made, the gateway ECU 15 buffers the output diagnostic information in the RAM thereof.

When it is determined that the data volume of the diagnostic information is equal to or larger than the predetermined information volume, the gateway ECU 15 makes an affirmative determination, and step G14 is then performed. In step G14, the gateway ECU 15 divides the obtained diagnostic information into plural pieces of the information such that each piece has the predetermined information volume, and outputs each piece of diagnostic information to the navigation ECU 11.

On the other hand, when it is determined that the data volume of the obtained diagnostic information is smaller than the predetermined information volume, the gateway ECU 15 makes a negative determination in step G13, and step G15 is then performed. In step G15, the gateway 15 outputs the obtained diagnostic information to the navigation ECU 11. In step N12, the navigation ECU 11 obtains the diagnostic information output in step G14 or step G15. At this time, the navigation ECU 11 can obtain the diagnostic information from the gateway ECU 15 only for a predetermined time (e.g., approximately 10 seconds). This prevents the diagnostic information having an enormous data volume from flowing through the network built in the vehicle 10. As a result, the network can be effectively prevented from being saturated. In addition, since the data volume of the diagnostic information obtained by the navigation ECU 11 is limited, communication time and communication costs can be reduced when the diagnostic information is transmitted to the center 20 and the automobile dealer. The navigation ECU 11 then ends the "abnormality information collecting routine" in step N13.

When the vehicle is placed in the automobile dealer for servicing, a failure information obtaining device (diagnostic tool) may be connected to the network built in the vehicle, and the diagnostic information may be collected by the failure information obtaining device. At this time, the output request signal output from the failure information obtaining device to each of the ECUs 16, 17, 18 and 19 is the same as the output request signal output from the gateway ECU 15 (or the failure information transmission request transmitted from the center 20). Therefore, each of the ECUs 16, 17, 18 and 19 outputs the diagnostic information stored in the RAM thereof to the network.

However, the gateway ECU 15 can distinguish between the output request signal output therefrom and the output request signal output from the failure information obtaining device. Therefore, the gateway 15 does not provide the navigation ECU 11 with the diagnostic information output to the network, when the failure information obtaining device is connected to the network. This prevents the diagnostic information from being erroneously transmitted from the vehicle placed in the automobile dealer for servicing to the center 20 and the automobile dealer, which minimizes unnecessary communication.

Note that prevention of erroneous transmission of the diagnostic information may be performed as below. The gateway ECU 15 prevents erroneous transmission of the diagnostic information output from the ECUs (e.g., the engine ECU 16) connected to the control system network (CAN) among the networks built in the vehicle 10. Meanwhile, the navigation ECU 11 prevents erroneous transmission of the diagnostic information output from the ECUs (e.g., the door ECU 18) connected to the body system network (BEAN) among the networks built in the vehicle 10. Thus, erroneous transmission of the diagnostic information may be prevented by the navigation ECU 11 and the gateway ECU 15.

The process returns to the flowchart in FIGS. 4A to 4C again. After step S21 is performed, the navigation ECU 11 provides the communication device 14 with the obtained diagnostic information, and the communication device 14 transmits the diagnostic information to the center 20 in step S22. When the diagnostic information is divided into plural pieces, the navigation ECU 11 provides these pieces of diagnostic information to the communication device 14 one by one, and the communication device 14 transmits these pieces of diagnostic information to the center 20 one by one in the order of provision. In this transmission, the communication device 14 transmits the vehicle ID information along with the diagnostic information.

In the case where the failure information obtaining device is connected to the network, when a failure has occurred in the gateway ECU 15 and an enormous volume of diagnostic information is transmitted to the center 20, the center 20 does not receive this diagnostic information. Namely, the center 20 can determine whether the diagnostic information is the diagnostic information transmitted according to the failure information transmission request transmitted therefrom. When the diagnostic information is transmitted due to a failure in the gateway ECU 15, the center 20 separately transmits a command for canceling the transmission of the diagnostic information to the navigation ECU 11. This prevents unnecessary communication between the vehicle 10 and the center 20.

In the center 20, in step C19, the control device 21 receives the failure information (diagnostic information) transmitted in step S22. The control device 21 then transmits the failure information (diagnostic information) to the automobile dealer computer 30 which has transmitted the registration completion notification, in step C20.

In step D14, the automobile dealer computer 30 receives the failure information (diagnostic information) transmitted in step C20, and step D15 is then performed. In step D15, the abnormality countermeasure information, which is more detailed than the abnormality countermeasure information transmitted in step D11 is transmitted based on the received failure information (diagnostic information). The person(s) responsible can accurately ascertain the abnormality which has occurred in the vehicle 10 by analyzing the received failure information (diagnostic information) in detail.

Accordingly, the person(s) responsible can deal with the cause of the failure which has occurred in the vehicle 10 individually, compared with the case where the alarm lamp illumination information is obtained. Therefore, the person(s) responsible prepares detailed countermeasures for the time until the vehicle 10 is placed in the automobile dealer for servicing. Examples of the countermeasures are "the engine coolant temperature is high. Please stop the vehicle at a safe place, and wait there until a carrier vehicle arrives" and "the abnormality does not cause a problem in running. Please keep driving and bring the vehicle in the automobile dealer you have reserved". The automobile dealer computer 30 then transmits the detailed abnormality countermeasure information indicating the detailed abnormality countermeasures prepared by the person(s) responsible to the center 20. Then, the "abnormality information transmission notifying program" ends in step D16.

In the center 20, in step C21, the control device 21 receives the detailed abnormality countermeasure information transmitted in step D15. The control device 21 then searches the user information database 24 and obtains the mail address information of the user, using the vehicle ID information received in step C19. The control device 21 transmits the received detail abnormality countermeasure information using the obtained mail address information. The control device 21 then ends the "abnormality information transmission notifying program" in step C22.

In the vehicle 10, in step S23, the communication device 14 receives the detailed abnormality countermeasure information transmitted in step C21, and provides the information to the navigation ECU 11. The navigation ECU 11 obtains the detailed abnormality countermeasure information. The navigation ECU 11 then provides the detailed abnormality countermeasure information to the display unit 13. The display unit 13 notifies the user of the detailed abnormality countermeasure information by displaying the information on the liquid crystal display or by voice, in the same manner as the notification in step S15. When the detailed abnormality countermeasure information is thus notified to the user, the navigation ECU 11 ends the "abnormality information transmission notifying program" in step S24.

In the above-mentioned vehicular diagnostic system, through the communication between the vehicle 10 and the center 20, the vehicle 10 transmits the alarm lamp illumination information and the failure information (diagnostic information) indicating an abnormality which has occurred in the vehicle 10 to the center 20, and the center 20 transmits the abnormality notification based on the abnormality countermeasure information from the automobile dealer, to the vehicle 10. Accordingly, it is necessary to make a diagnosis of whether the communication between the vehicle 10 and the center 20 is performed appropriately at predetermined intervals. The diagnosis of the communication will be described below in detail.

Figure 7:
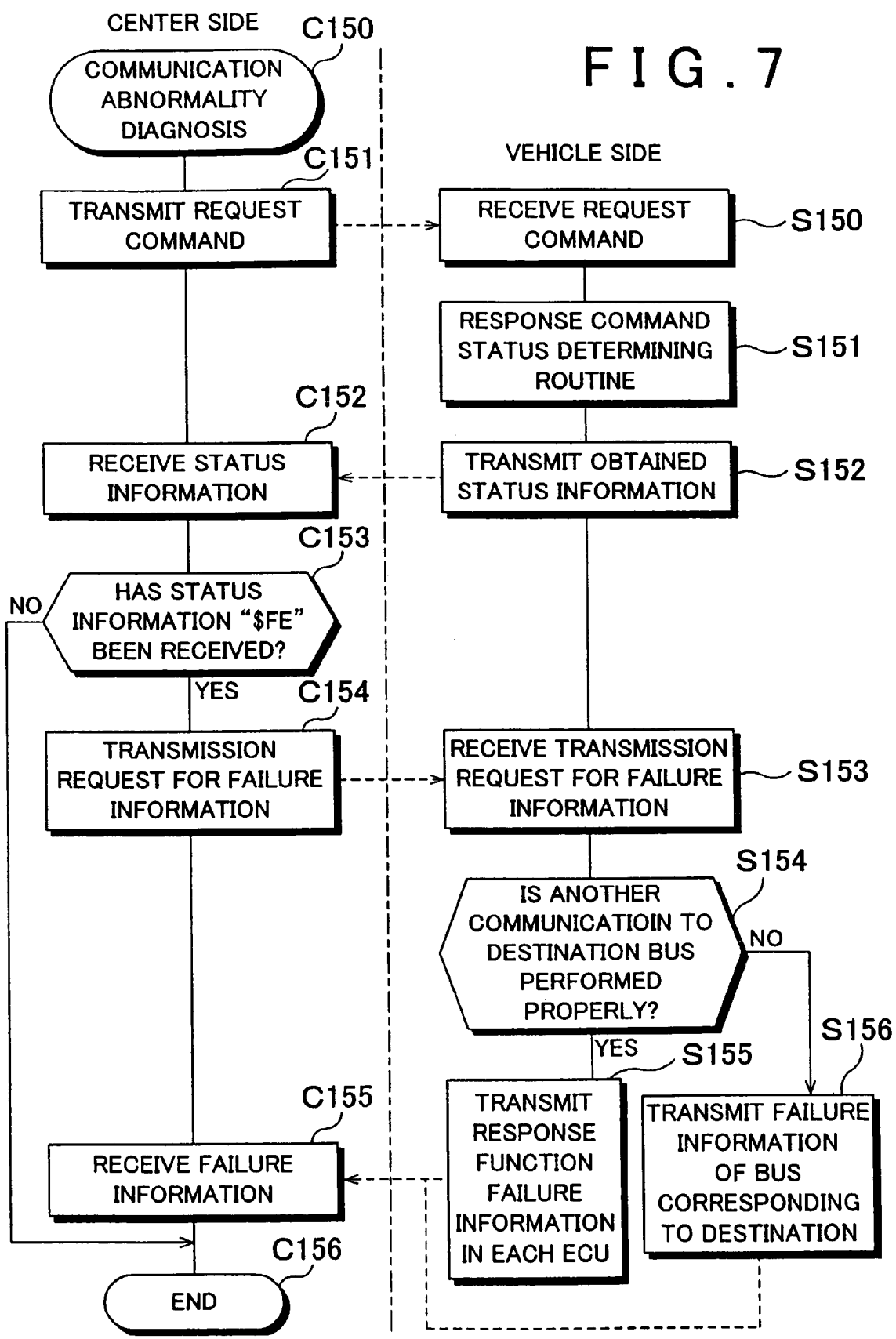
FIG. 7 is a flowchart of a communication abnormality diagnostic program performed by the vehicle and the center shown in FIG. 1.

The diagnosis of the communication is made by performing the "communication abnormality diagnostic program" shown in FIG. 7 at predetermined intervals. The "communication abnormality diagnostic program" is started in step C150. In step C151, the control device 21 of the center 20 transmits a predetermined command for diagnosing the communication state (hereinafter, referred to as a "request command") to the vehicle 10.

In the vehicle 10, in step S150, the communication device 14 receives the request command transmitted in step C151, and provides the received request command to the navigation ECU 11. The navigation ECU 11 obtains the provided request command, and provides the obtained request command to the gateway ECU 15. The navigation ECU 11 and the gateway ECU 15, to which the request command is provided, perform a "response command status determining routine" in step S151 in cooperation with each other.

As shown in FIG. 8, the "response command status determining routine" is started in step S200. In step S201, the navigation ECU11 and the gateway ECU 15 determine whether each of the ECUs 16, 17, 18 and 19 responds to the request command properly, and transmits a response to the center 20 properly. When it is determined that each of the devices and ECUs mounted in the vehicle 10 responds to the request command properly, and transmits a response to the request command properly, both the navigation ECU 11 and the gateway ECU 15 make an affirmative determination, and step S202 is then performed.

In step S202, the navigation ECU 11 and the gateway ECU 15 store the status information "$00", which indicates that each of the devices and ECUs responds to the request command properly, that is, an abnormality has not occurred, in the RAM of the navigation ECU 11. In step S209, the "response command status determining routine" ends. On the other hand, when it is determined that an abnormality has occurred in at least one of the devices or at least one of the ECUs, and the device or the ECU does not respond to the request command properly, both the navigation ECU 11 and the gateway ECU 15 make a negative determination, and step S203 is then performed.

In step S203, the navigation ECU 11 determines whether the command can be recognized. When the request command itself transmitted from the center 20 is the information which cannot be recognized by the navigation ECU 11 (undefined information), the navigation ECU 11 makes a negative determination, and step S204 is then performed. In step S204, the navigation ECU 11 stores the status information "$FF", which indicates that the request command is the information which cannot be recognized, in the RAM. In step S209, the "response command status determining routine" ends. On the other hand, when the request command is the information which can be recognized by the navigation ECU 11, the navigation ECU 11 makes an affirmative determination, and step S205 is then performed.

In step S205, the gateway ECU 15 provides the request command to each of the ECUs 16, 17, 18 and 19, and determines whether each of the ECUs does not make a response, and whether the response is time-out when there is a response. When it is determined that there is no response from the ECUs 16, 17, 18 and 19, or the response is time-out, the gateway ECU 15 makes an affirmative determination, and step S206 is then performed. In step S206, the gateway ECU15 outputs the status information "$FE", which indicates that an abnormality has occurred in at least one of the ECUs 16, 17, 18 and 19, to the navigation ECU 11. In step S209, the "response command status determining routine" ends. On the other hand, when there is a response from the ECUs 16, 17, 18 and 19, and the response is not time-out, the gateway ECU 15 makes a negative determination, and step S207 is then performed.

In step S207, the navigation ECU 11 determines whether the gateway ECU 15 responds to the request command. When there is a gateway ECU 15 or when the gateway ECU 15 is connected to the network built in the vehicle 10 and therefore the gateway ECU 15 responds to the request command, the navigation ECU 11 makes an affirmative determination. In this case, since the status information is not output, the navigation ECU 11 and the gateway ECU 15 perform step S201 and the following steps again, and repeatedly perform these steps until the status information is output. On the other hand, when there is no gateway ECU 15 or when the gateway ECU 15 is not connected to the network built in the vehicle 10 and therefore the gateway ECU 15 does not respond to the request command, the navigation ECU 11 makes a negative determination, and step S208 is then performed. In step S208, the navigation ECU 11 stores the status information "$FD", which indicates that there is no gateway ECU 15 or that the gateway ECU 15 is not connected to the network, in the RAM. In step S209, the "response command status determining routine" ends.

The process returns to the flowchart in FIG. 7. After step S151 is performed, in step S152, the navigation ECU 11 provides the obtained status information to the communication device 14, and instructs the communication device 14 to transmit the status information to the center 20. The communication device 14 transmits the status information to the center 20 according to the instruction.

In the center 20, in step C152, the control device 21 receives the status information transmitted in step S152, and temporarily stores the status information in the RAM. Step C153 is then performed. By receiving the status information from the vehicle 10, the control device 21 of the center 20 can ascertain where in the vehicle 10 the abnormality has occurred, in addition to whether an abnormality has occurred in the communication.

In step C153, the control device 21 determines whether the status information "$FE", that is, the status information indicating that an abnormality has occurred in at least one of the ECUs 16, 17, 18 and 19, has been received. When the status information has not been received, the control device 21 makes a negative determination, and the "communication abnormality diagnostic program" ends in step C156. On the other hand, when the status information "$FE" has been received, the control device 21 makes an affirmative determination, and step C154 is then performed.

In step C154, the control device 21 requests the vehicle 10 to transmit the failure information in order to check in which of the ECU among the ECUs 16, 17, 18 and 19 an abnormality has occurred, or whether an abnormality has occurred in a connection path connecting the ECUs to each other (hereinafter, this connection path will be referred to as a "destination bus"). When transmission of the failure information is requested, the destination information of each of the ECUs 16, 17, 18 and 19 is attached and transmitted.

In the vehicle 10, in step S153, the communication device 14 receives the transmission request for the failure information transmitted in step C154, and provides the transmission request to the navigation ECU 11. The navigation ECU 11 obtains the transmission request for the provided failure information, and provides the transmission request to the gateway ECU 15.

In step S154, the gateway ECU 15 outputs the output request for the failure information to each of the ECUs 16, 17, 18 and 19 using the destination information attached to the transmission request for the failure information obtained in step S153. At least when there is a response from the ECUs 16, 17, 18 and 19 to the output request, another communication to the destination bus is performed properly. Therefore, the gateway ECU 15 makes an affirmative determination, and step S155 is then performed. In step S155, the gateway ECU 15 outputs the failure information, which indicates that an abnormality has occurred in the response function of at least one of the ECUs 16, 17, 18 and 19, to the navigation ECU 11. The navigation ECU 11 obtains the output failure information, and provides the failure information to the communication device 14. The communication device 14 transmits the provided failure information to the center 20.

On the other hand, in step S154, when there is no response from the ECUs 16, 17, 18 and 19, an abnormality has occurred in the destination bus. Therefore, the gateway ECU 15 makes a negative determination, and step S156 is then performed. In step S156, the gateway ECU 15 outputs the failure information indicating that an abnormality has occurred in the destination bus to the navigation ECU 11. The navigation ECU 11 obtains the output failure information, and provides the failure information to the communication device 14. The communication device 14 transmits the provided failure information to the center 20.

In the center 20, in step C155, the control device 21 receives the failure information transmitted in step S155 or S156. Thus, the control device 21 can determine in which of the ECU among the ECUs 16, 17, 18 and 19 an abnormality has occurred, or whether an abnormality has occurred in the destination bus connecting the ECUs to each other. Then, the "communication abnormality diagnostic program" ends in step C156.

In the above-mentioned vehicular diagnostic system, the user can check the alarm lamp illumination information and the abnormality notification transmitted from the center 20 by the display indicated on the display unit 13 mounted in the vehicle 10 or by voice. In addition, the alarm lamp illumination information and the abnormality notification can be checked by using the personal computer 40 or the portable information terminal device 50 which can be used by the user.

The user operates the personal computer 40 or the portable information terminal device 50, and accesses the center 20 via the network 60. More particularly, the user inputs the URL (Uniform Resource Locator) of the center 20 which is notified in advance, the user ID information, and the user password, through the use of the input device of the personal computer 40 or the portable information terminal device 50.

Thus, the personal computer 40 or the portable information terminal device 50 accesses the center 20 based on the input URL. When the personal computer 40 or the portable information terminal device 50 accesses the center 20, the control device 21 of the center 20 authenticates the user based on the transmitted user ID information and the user password. The control device 21 authenticates the user by comparing the user identification information stored in the database 24 in advance with the transmitted user ID information and the user password, using the user information database 24. When authenticating the user, the control device 21 transmits the initial screen information to the personal computer 40 or the portable information terminal device 50. When transmitting the initial screen information, the control device 21 incorporates the vehicle ID information (e.g., registration number) stored in the user information database 24 in advance into the initial screen information, and transmits this initial screen information.

Figure 11:
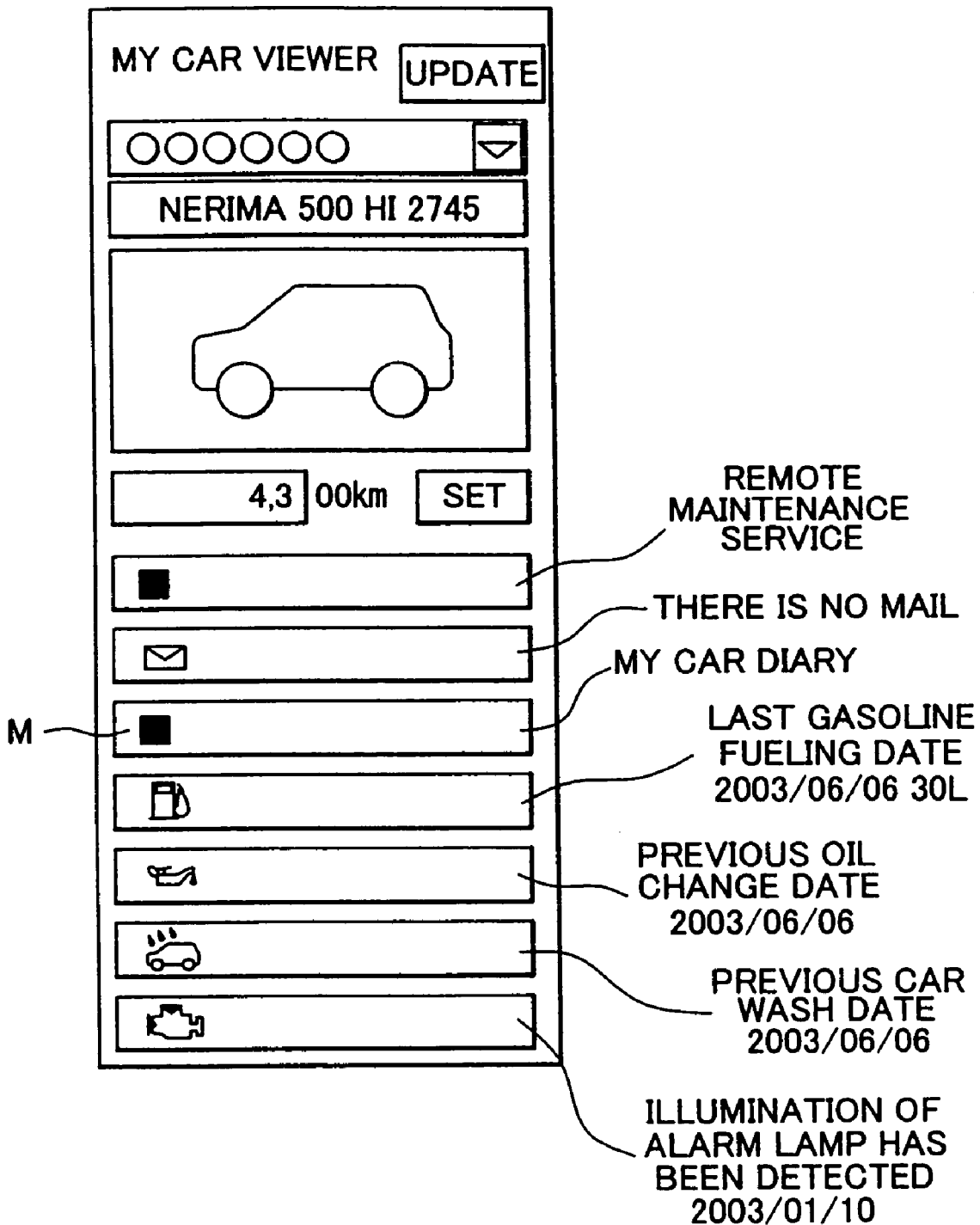
FIG. 11 is a view for describing an initial screen when a user accesses the center through the use of a portable information terminal device or a personal computer shown in FIG. 1.

When the initial screen information is transmitted from the center 20, the initial screen is displayed on the display unit of the personal computer 40 or the portable information terminal device 50, as shown in FIG. 11. On the initial screen, when the user clicks the "my car diary" button "M", this selection information is transmitted to the center 20. When receiving the selection information, the control device 21 of the center 20 extracts the history information which is stored in relation with the vehicle ID information that matches the above vehicle ID information in all the history information stored in the history information database 27, using the vehicle ID information. The control device 21 transmits the my car diary screen information, which is automatically prepared by incorporating the extracted history information into the predetermined format, to the personal computer 40 or the portable information terminal device 50.

Figure 12:
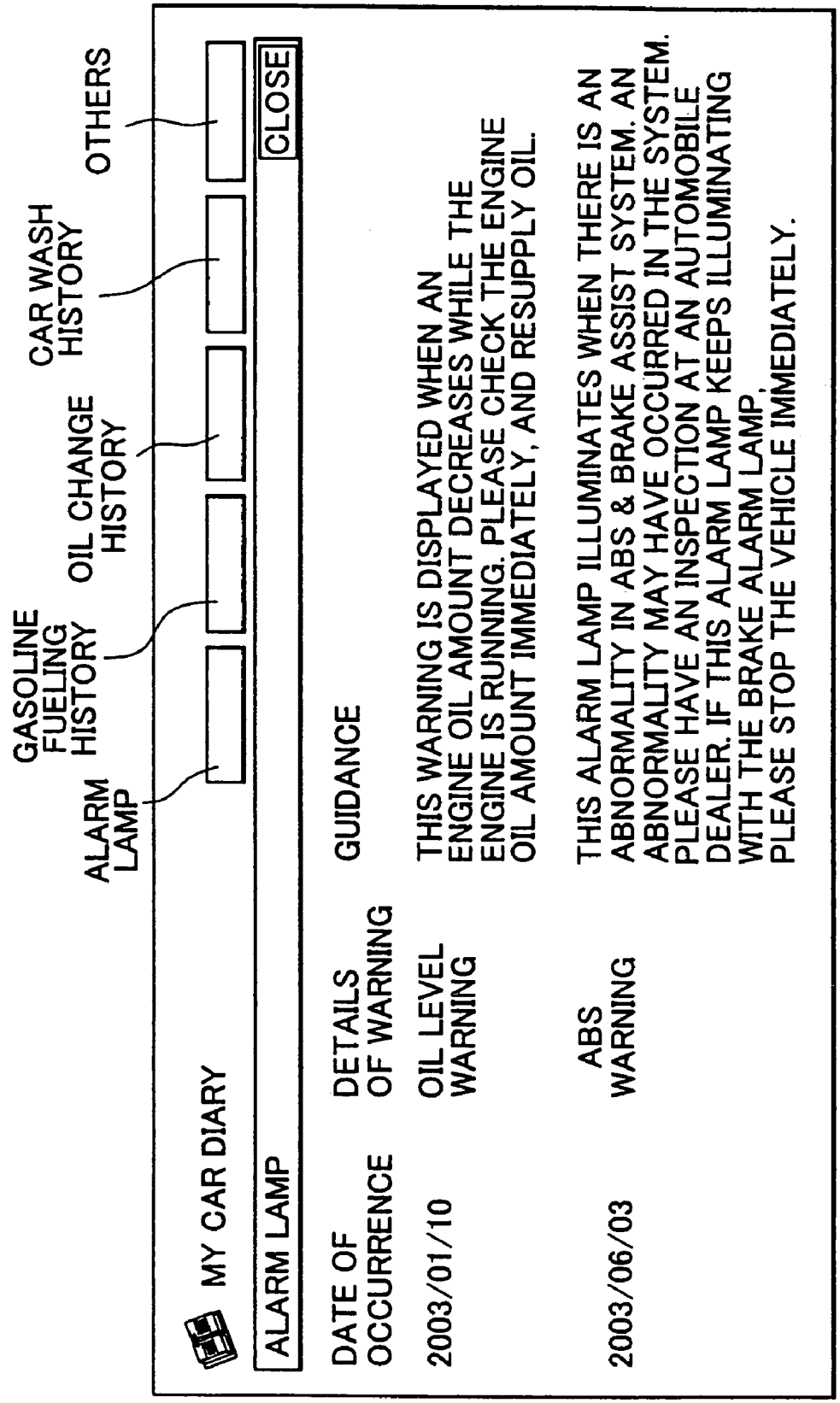
FIG. 12 is a view indicating a screen showing an alarm lamp illumination history when the user accesses the center through the use of the portable information terminal device or the personal computer shown in FIG. 1.

When receiving the my car diary screen information transmitted from the center 20, the personal computer 40 or the portable information terminal device 50 changes the display screen from the initial screen, and displays the my car diary screen, as shown in FIG. 12. Thus, the user can check the date when an abnormality occurred in the vehicle 10, the cause of the alarm lamp illumination and the guidance, using the personal computer 40 or the portable information terminal device 50.

Also, the user can obtain the automobile dealer information by accessing the center 20 using the personal computer 40 or the portable information terminal device 50. The user can access the automobile dealer information database 26 by accessing the center 20 using the personal computer 40 or the portable information terminal device 50. This offers convenience to the user, since the user can obtain the automobile dealer information, that is, the business days and business hours when necessary.

Since the user obtains the automobile dealer information according to the operation by the user, leaking of the private information can be prevented. For example, when the automobile dealer information is unilaterally transmitted from the automobile dealer to the user, the automobile dealer needs to obtain the user private information such as an e-mail address or a phone number in advance. However, since the user and the automobile dealer communicate with each other via the center 20, the automobile dealer need not obtain the private information. Therefore, the private information need not be unnecessarily shared with the automobile dealer. As a result, the private information can be reliably protected.

As can be understood from the above description, according to the embodiment, since the vehicle 10 transmits the alarm lamp illumination information to the center 20, a load is prevented from being placed on the communication line. Therefore, the center 20 can ascertain whether an abnormality has occurred in the vehicle 10 in real time, which enables prompt provision of countermeasures to the user. The vehicle 10 collects and transmits the failure information (diagnostic information) related to the abnormality, after transmitting the alarm lamp illumination information. The center 20 can thus check the abnormality in more detail, which enables provision of more appropriate countermeasures to the user.

The center 20 transmits the abnormality notification for occurrence of an abnormality based on the alarm lamp illumination information. Therefore, the user can easily take appropriate countermeasures for the abnormality. Also, the center 20 transmits the detailed abnormality countermeasure information for the abnormality based on the failure information (diagnostic information). Therefore, the user can take appropriate countermeasures for the abnormality.

Since the abnormality countermeasure information and the detailed abnormality countermeasure information are prepared by the person(s) responsible at the automobile dealer, expert opinions regarding the abnormality can be included. Therefore, the user can take more appropriate countermeasures for the abnormality. Since the person(s) responsible can analyze the abnormality, appropriate countermeasures can be taken for each cause of the abnormality individually. Therefore, the user can take more appropriate countermeasures. By transmitting the failure information, that is, the diagnostic information from the vehicle 10, the automobile dealer can ascertain the abnormality accurately. Therefore, appropriate countermeasures can be provided to the user.

The center 20 can obtain the failure information (diagnostic information) from the vehicle 10 when necessary. The center 20 can transmit the obtained failure information (diagnostic information) to the automobile dealer computer 30. Therefore, the center 20 can transmit the detailed abnormality countermeasure information prepared at the automobile dealer to the user at appropriate timing.

Also, the vehicle 10 collects the failure information (diagnostic information) when being stopped. This prevents an increase in a load placed on the ECUs 16, 17, 18 and 19 which control the devices related to functions necessary for running of the vehicle 10, that is, "run, stop, and turn". Therefore, the user can drive the vehicle suitably.

Also, collection of the failure information (diagnostic information) can be started when the user operates the reservation button 13b incorporated in the abnormality notification. Therefore, an intention of the user can be directly or indirectly reflected on the determination whether the failure information (diagnostic information) is to be transmitted.

Also, the alarm lamp illumination history can be checked by using the personal computer 40 or the portable information terminal device 50. Thus, the user can check an abnormality which has occurred in the vehicle 10, for example, by using a cellular phone, even when the user is not in the vehicle 10. Also, a person other than the user can check an abnormality which has occurred in the vehicle using a cellular phone or the like. Thus, for example, when the alarm lamp 17a of the vehicle 10 turns off immediately after illuminating and the user has not recognized occurrence of an abnormality, a person other than the user can notify the user of occurrence of the abnormality.

In the above embodiment, the center 20 transmits the abnormality notification to the vehicle 10 based on the abnormality countermeasure information transmitted from the automobile dealer computer 30 via the communication between the center 20 and the automobile dealer computer 30 in the automobile dealer. Instead of this, the abnormality countermeasure information may be prepared at the center 20 and then the abnormality notification may be transmitted. In this case, the abnormality countermeasure information is stored in the center 20 in advance, and the control device 21 of the center 20 appropriately select the stored abnormality countermeasure information based on the alarm lamp illumination information and the failure information (diagnostic information). The control device 21 then prepares the abnormality notification using the selected abnormality countermeasure information, and transmits the abnormality notification to the vehicle. In this method, the same effects as those in the above embodiment can be obtained.

The invention claimed is:

1. A vehicular diagnostic method, comprising:
   determining whether a failure has occurred in a device mounted in a vehicle;
   transmitting a first failure information that specifies the failure that is determined to have occurred, from the vehicle to a communications center;
   receiving the first failure information at the communications center, whereupon a first countermeasure information, which provides countermeasures for the failure specified in the first failure information, is prepared;
   transmitting the first countermeasure information from the communications center to the vehicle;
   receiving the first countermeasure information at the vehicle, whereupon the vehicle notifies a user of the vehicle of the countermeasures provided in the first countermeasure information and requests an ECU of the device that has the failure to provide details regarding the failure and proceeds to collect the details regarding the failure from the ECU of the device that has the failure for transmission in a second failure information which specifies the collected details regarding the failure;
   determining whether a data volume of the second failure information is equal to or larger than a predetermined information volume;
   dividing the second failure information into plural pieces of the information such that each piece has the predetermined information volume when the data volume of the second failure information is equal to or larger than the predetermined information volume;
   transmitting the second failure information from the vehicle to the communications center;
   receiving the second failure information at the communications center, whereupon the collected details regarding the failure specified in the second failure information, are checked and a second countermeasure information, which provides detailed countermeasures for the failure, is prepared;
   transmitting the second countermeasure information from the communications center to the vehicle; and
   receiving the second countermeasure information at the vehicle, whereupon the vehicle notifies the user of the detailed countermeasures provided in the second countermeasure information.

2. The vehicular diagnostic method according to claim 1, wherein:
upon receiving the first failure information, the communications center transmits the first failure information to a computer provided at an automobile dealer that services the vehicle, which prepares the first countermeasure information in response to the first failure information and transmits the prepared first countermeasure information to the communications center; and, wherein
upon receiving the second failure information, the communications center transmits the second failure information to the computer at the automobile dealer, which prepares the second countermeasure information in response to the second failure information and transmits the prepared second countermeasure information to the communications center.

3. The vehicular diagnostic method according to claim 1, wherein
it is determined that a failure has occurred in the device mounted in the vehicle when an alarm lamp, which illuminates when an abnormality has occurred in the device mounted in the vehicle, illuminates; and
the first failure information indicates that the alarm lamp has illuminated.

4. The vehicular diagnostic method according to claim 1, wherein
the collected details regarding the failure specified in the second failure information include at least one of sensor information from various sensors mounted in the vehicle, operation state information of the device mounted in the vehicle, and self-diagnosis information from the device mounted in the vehicle.

5. The vehicular diagnostic method according to claim 1, further comprising:
transmitting an information transmission request, which requests the vehicle to transmit the second failure information, from the communications center after the first failure information has been received; and
receiving the information transmission request at the vehicle, whereupon the vehicle transmits the second failure information to the communications center.

6. The vehicular diagnostic method according to claim 1, further comprising:
determining whether the vehicle is running, wherein
collection of at least the details regarding the failure for transmission in the second failure information is prohibited when it is determined that the vehicle is running, and
collection of at least the details regarding the failure for transmission in the second failure information proceeds when it is determined that the vehicle is not running.

7. The vehicular diagnostic method according to claim 6, wherein
the collection of at least the details regarding the failure for transmission in the second failure information, when it is determined that the vehicle is not running, proceeds when the user of the vehicle performs a predetermined operation.

8. The vehicular diagnostic method according to claim 7, wherein
the predetermined operation performed by the user initiates the collection of the details regarding the failure for transmission in the second failure information.

9. The vehicular diagnostic method according to claim 8, wherein
the predetermined operation performed by the user is an operation of an operating means that includes a preset function to initiate the collection of the details regarding the failure for transmission in the second failure information.

10. The vehicular diagnostic method according to claim 1, wherein
the details regarding the failure to be collected for transmission in the second failure information are related only to the failure specified in the first failure information.

11. The vehicular diagnostic method according to claim 1, wherein
the vehicle transmits the first failure information at predetermined intervals of time, when transmitting the first failure information to the communications center two or more times.

12. The vehicular diagnostic method according to claim 1, wherein
the center receives the first failure information at predetermined intervals of time, when receiving the first failure information from the vehicle two or more times.

13. The vehicular diagnostic method according to claim 1, wherein
the vehicle transmits the second failure information at predetermined intervals of time, when transmitting the second failure information to the communications center two or more times.

14. The vehicular diagnostic method according to claim 1, wherein
the center receives the second failure information at predetermined intervals of time when receiving the second failure information from the vehicle two or more times.

15. The vehicular diagnostic method according to claim 1, further comprising
storing at least the first failure information, from among the first failure information and second failure information, transmitted from the vehicle to the communications center; and
providing at least the first failure information stored at the communications center to an external terminal device requesting at least the first failure information.

16. A vehicular diagnostic system, comprising:
failure detection means, provided in a vehicle, for detecting the occurrence of a failure in a device mounted in the vehicle;
failure information output means, provided in the vehicle, for outputting failure information specifying the failure detected by the failure detection means;
vehicle communication means, provided in the vehicle, for transmitting failure information, which is output from the failure information output means and for receiving countermeasure information;
communications center communication means, provided at a communications center, for receiving failure information from the vehicle and for transmitting countermeasure information to the vehicle;
countermeasure information preparation means, provided at the communications center, for preparing countermeasure information that provides countermeasures for the failure specified in failure information from the vehicle, and
vehicle failure notification means for notifying a user of the vehicle of countermeasures provided in countermeasure information from the communications center; wherein
the failure information output means outputs a first failure information that specifies the failure detected by the failure detection means in the device mounted in the vehicle and the vehicle communication means transmits the first failure information from the vehicle to the communications center;

the countermeasure information preparation means prepares a first countermeasure information in response to the failure specified in the first failure information received by the communications center communication means and the communications center communication means transmits the first countermeasure information to the vehicle;

the vehicle failure notification means notifies the user of the countermeasures provided in the first countermeasure information;

the failure information means requests an ECU of the device that has the failure to provide details regarding the failure and proceeds to collect the details regarding the failure detected by the failure detection means from the ECU of the device that has the failure for transmission in a second failure information;

the failure information means determines whether a data volume of the second failure information is equal to or larger than a predetermined information volume, and divides the second failure information into plural pieces of the information such that each piece has the predetermined information volume when the data volume of the second failure information is equal to or larger than the predetermined information volume;

the vehicle communication means transmits the second failure information to the communications center when the vehicle communication means receives the first countermeasure information;

the countermeasure information preparation means prepares a second countermeasure information in response to the collected details regarding the failure specified in the second failure information and the communications center communication means transmits the second countermeasure information to the vehicle; and the failure notification means notifies the user of detailed countermeasures indicated in the second countermeasure information when the vehicle communication means receives the second countermeasure information.

17. The vehicular diagnostic system according to claim 16, further comprising:
storage means, provided at the communications center, for storing at least the first failure information from among the first failure information and the second failure information received by the center communication means.

18. The vehicular diagnostic system according to claim 16, wherein
the failure detection means is an alarm lamp illumination device mounted in the vehicle.

19. The vehicular diagnostic system according to claim 16, wherein
the collected details regarding the failure, specified in the second failure information, include at least one of sensor information from various sensors mounted in the vehicle, operation state information of the device mounted in the vehicle, and self-diagnosis information from the device mounted in the vehicle.

20. A vehicle, comprising:
failure detection means for detecting the occurrence of a failure in a device mounted in the vehicle;
failure information output means for means for outputting failure information specifying the failure detected by the failure detection means;
communication means for transmitting failure information, output from the failure information output means, to a device outside of the vehicle and for receiving countermeasure information from the device outside of the vehicle; and
failure notification means for notifying a user of the vehicle of countermeasures indicated in countermeasure information from the device outside of the vehicle, wherein the failure information output means outputs a first failure information that specifies the failure detected by the failure detection means in the device mounted in the vehicle, the communication means transmits the first failure information to the device outside of the vehicle and receives a first countermeasure information from the device in response;

after receiving the first countermeasure information, the vehicle failure notification means notifies the user of the countermeasures provided in the first countermeasure information and requests an ECU of the device that has the failure to provide details regarding the failure;

the failure information means proceeds to collect the details regarding the failure detected by the failure detection means from the ECU of the device that has the failure for transmission in a second failure information, determines whether a data volume of the second failure information is equal to or larger than a predetermined information volume, and divides the second failure information into plural pieces of the information such that each piece has the predetermined information volume when the data volume of the second failure information is equal to or larger than the predetermined information volume;

the communication means transmits the second failure information to the device outside of the vehicle and receives a second countermeasure information from the device in response, the failure notification means notifies the user of countermeasures indicated in the second countermeasure information.

21. The vehicle according to claim 20, wherein
the failure detection means of the vehicle is an alarm lamp illumination device mounted in the vehicle.

22. The vehicle according to claim 20, wherein
the collected details regarding the failure specified in the second failure information include at least one of sensor information from various sensors mounted in the vehicle, operation state information of the device mounted in the vehicle, and self-diagnosis information from the device mounted in the vehicle.

23. A vehicular diagnostic system comprising:
a failure detection device, provided in a vehicle, that detects the occurrence of a failure in a device mounted in the vehicle; and
a vehicle communication device, provided in a vehicle, that transmits failure information specifying the failure detected by the failure detection device;
a communications center communication device, provided at a communications center, that receives failure information transmitted from the vehicle and transmits countermeasure information that provides countermeasures for the specified failure to the vehicle;
a failure notification device, provided in the vehicle, that notifies a user of the vehicle countermeasures indicated in countermeasure information from the communications center; and
a controller, provided in the vehicle, that collects detailed failure information regarding the detected failure after the vehicle communication device receives countermeasure information from the communications center; wherein the vehicle communication device transmits a first failure information specifying the failure detected by the failure detection device to the communications center when the failure detection device detects the failure in the device mounted in the vehicle and;

the communications center communication device receives the first failure information and transmits to the vehicle a first countermeasure information, which provides countermeasure for the failure specified in the first failure information, in response;

when the vehicle communication device receives the first countermeasure information, the failure notification device notifies the user of countermeasures indicated in the first countermeasure information and requests an ECU of the device that has the failure to provide details regarding the failure and the controller proceeds to collect the details regarding the failure from the ECU of the device that has the failure for transmission in a second failure information;

the controller determines whether a data volume of the second failure information is equal to or larger than a predetermined information volume, and divides the second failure information into plural pieces of the information such that each piece has the predetermined information volume when the data volume of the second failure information is equal to or larger than the predetermined information volume;

the vehicle communication device transmits the second failure information to the to the communications center;

the communications center communication device receives the second failure information and transmits to the vehicle a second countermeasure information, which provides countermeasures for the second failure information, in response; and the failure notification device notifies the user of countermeasures provided in the second countermeasure information when the vehicle communication device receives the second countermeasure information.

24. The vehicular diagnostic system according to claim 23, further comprising:

a storage device, provided at the communications center, that stores at least the first failure information from among the first failure information and the second failure information received by the center communication device.

25. The vehicular diagnostic system according to claim 23, wherein the failure detection device of the vehicle is an alarm lamp illumination device mounted in the vehicle.

26. The vehicular diagnostic system according to claim 23, wherein the collected details regarding the failure specified in the second failure information include at least one of sensor information from various sensors mounted in the vehicle, operation state information of the device mounted in the vehicle, and self-diagnosis information from the device mounted in the vehicle.

27. The vehicular diagnostic system according to claim 23, wherein the failure notifying device is a navigation unit.

28. A vehicle, comprising:

a failure detection device that detects the occurrence of a failure in a device mounted in the vehicle;

a controller that requests an ECU of the device that has the failure to provide details regarding the failure and outputs a first failure information specifying the detected failure, proceeds to collect the details regarding the failure detected by the failure detection device from the ECU of the device that has the failure, determines whether a data volume of a second failure information is equal to or larger than a predetermined information volume, divides the second failure information into plural pieces of the information such that each piece has the predetermined information volume when the data volume of the second failure information is equal to or larger than the predetermined information volume, and outputs the second failure information specifying detailed information regarding the detected failure;

a communication device that transmits the first failure information output from the controller and transmits the second failure information output from the controller to the device outside of the vehicle, and that receives a first countermeasure information, responding to the first failure information, and a second countermeasure information, responding to the second failure information, from the device outside of the vehicle; and a failure notification device that notifies a user of the vehicle of countermeasures provided in the first countermeasure information and the second countermeasure information.

29. The vehicle according to claim 28, wherein the failure detection device is an alarm lamp illumination device mounted in the vehicle.

30. The vehicle according to claim 28, wherein the collected details regarding the failure specified in the second failure information include at least one of sensor information from various sensors mounted in the vehicle, operation state information of the device mounted in the vehicle, and self-diagnosis information from the device mounted in the vehicle.

31. The vehicle according to claim 28, wherein the failure notification device is a navigation unit.

* * * * *

UNITED STATES PATENT AND TRADEMARK OFFICE
CERTIFICATE OF CORRECTION

PATENT NO. : 7,647,146 B2  Page 1 of 1
APPLICATION NO. : 10/565781
DATED : January 12, 2010
INVENTOR(S) : Taki It is certified that error appears in the above-identified patent and that said Letters Patent is hereby corrected as shown below:

Col. 29, line 22, "lamer" should read --larger--.

Signed and Sealed this

Twentieth Day of April, 2010

David J. Kappos
*Director of the United States Patent and Trademark Office*